(12) United States Patent
Martin

(10) Patent No.: US 7,773,299 B2
(45) Date of Patent: Aug. 10, 2010

(54) CONTROLLING LIGHT TRANSMISSION IN A VEHICLE WITH POLARIZATION AND ELLIPTICITY ADJUSTMENT

(75) Inventor: Alexander Samuel Martin, Hamilton (CA)

(73) Assignee: Aither Optics Inc., Ontario (CA)

( * ) Notice: Subject to any disclaimer, the term of this patent is extended or adjusted under 35 U.S.C. 154(b) by 669 days.

(21) Appl. No.: 11/809,029

(22) Filed: May 31, 2007

(65) Prior Publication Data

US 2008/0297898 A1    Dec. 4, 2008

(51) Int. Cl.
*G02B 5/30* (2006.01)
*G02B 27/28* (2006.01)

(52) U.S. Cl. .................. 359/501; 359/601; 296/97.1

(58) Field of Classification Search .......... 359/483, 359/485, 501, 591–594, 601; 296/97.1, 97.2
See application file for complete search history.

(56) References Cited

U.S. PATENT DOCUMENTS

| | | |
|---|---|---|
| 2,031,045 A | 2/1936 | Land |
| 2,301,126 A | 11/1942 | Kriebel |
| 2,367,096 A | 1/1945 | Chubb, Jr. |
| 2,433,503 A | 12/1947 | Young |
| 2,440,133 A | 4/1948 | Young |
| 3,808,422 A | 4/1974 | Handtmann et al. |
| 4,961,625 A | 10/1990 | Wood et al. |
| 5,066,108 A | 11/1991 | McDonald |
| 5,206,752 A | 4/1993 | Itoh et al. |
| 5,486,840 A | 1/1996 | Borrego et al. |
| 5,602,661 A | 2/1997 | Schadt et al. |
| 5,657,161 A * | 8/1997 | Melograne .................. 359/501 |
| 5,903,330 A | 5/1999 | Funfschilling et al. |
| 5,973,760 A | 10/1999 | Dehmlow |
| 6,020,945 A | 2/2000 | Sawai et al. |
| 6,025,958 A | 2/2000 | Yamaoka et al. |
| 6,552,850 B1 | 4/2003 | Dudasik |

(Continued)

FOREIGN PATENT DOCUMENTS

GB    365507    1/1932

(Continued)

OTHER PUBLICATIONS

Yip, W.C. et al., "Photo-Patterned E-Wave Polarizer," Displays, 2001, vol. 22, pp. 27-32.

(Continued)

*Primary Examiner*—Frank G Font
(74) *Attorney, Agent, or Firm*—John C. McMahon

(57) ABSTRACT

Light transmission in a vehicle may be controlled using a system that includes a linear polarizing means and an ellipticity increaser associated with a display in the vehicle. The ellipticity increaser is configured and oriented with respect to the linear polarizing means for increasing the ellipticity of light passing from the linear polarizing means through the ellipticity increaser. The system also includes an ellipticity adjuster and a linear polarizer associated with a window of the vehicle. The ellipticity adjuster is oriented with respect to the linear polarizer for increasing the ellipticity of light passing from the linear polarizer through the ellipticity adjuster. The ellipticity increaser and adjuster are disposed between the linear polarizing means and the linear polarizer, and are configured and oriented with respect to each other for reducing ellipticity of light passing from the linear polarizing means through the ellipticity increaser and adjuster to the linear polarizer.

49 Claims, 8 Drawing Sheets

U.S. PATENT DOCUMENTS

| | | | |
|---|---|---|---|
| 6,628,369 | B2 | 9/2003 | Kumagai et al. |
| 6,646,801 | B1 | 11/2003 | Sley |
| 6,674,532 | B2 * | 1/2004 | VanDelden ............... 356/491 |
| 6,864,932 | B2 | 3/2005 | Miyatake et al. |
| 6,882,384 | B1 | 4/2005 | Sharp |
| 6,909,544 | B2 | 6/2005 | Kolosowsky |
| 2002/0169267 | A1 | 11/2002 | Minakuchi et al. |
| 2003/0089956 | A1 * | 5/2003 | Allen et al. ............... 257/432 |
| 2003/0095331 | A1 | 5/2003 | Bengoechea et al. |
| 2006/0056026 | A1 | 3/2006 | Kolosowsky et al. |
| 2007/0097503 | A1 * | 5/2007 | Tsuji ....................... 359/493 |

FOREIGN PATENT DOCUMENTS

| | | |
|---|---|---|
| JP | 10-049063 | 2/1998 |
| JP | 10-051764 | 2/1998 |

OTHER PUBLICATIONS

Hong, Qi et al., "Designs of wide-view and broadband circular polarizers," Optics Express, 2005, vol. 13, pp. 8318-8331.

Tang, S.T. et al., "Mueller Calculus and Perfect Polarization Conversion Modes in Liquid Crystal Displays," Journal of Applied Physics, 2001, vol. 89, pp. 5288-5294.

Tang, S.T. et al., "Reflective Twisted Nematic Liquid Crystal Displays. I. Retardation Compensation," Journal of Applied Physics, 1997, vol. 81, pp. 5924-5929.

Hale, P.D. et al., "Stability of birefringent linear retarders (waveplates)," Applied Optics, 1988, vol. 27, No. 24, pp. 5146-5153.

Lakhtakia, Akhlesh et al., "Circular Polarization Filters," Encyclopedia of Optical Engineering, 2003, pp. 230-236.

* cited by examiner

CONTROLLING LIGHT TRANSMISSION IN A VEHICLE WITH POLARIZATION AND ELLIPTICITY ADJUSTMENT

FIELD OF THE INVENTION

The present invention relates to methods and systems for controlling light transmission in vehicles and vehicles having such systems.

BACKGROUND OF THE INVENTION

In many situations, it is desirable to selectively transmit light in order to limit visibility of a light source to certain observers.

For example, some vehicles, such as motor vehicles, are equipped with a display device, such as a TV, video player, gaming device, dashboard display, or the like. Display monitors are now commonly mounted inside automobiles for viewing by occupants. For various reasons such as safety and privacy, it is sometimes desirable to limit the visibility of the displayed image through a vehicle window, so that an observer outside the vehicle such as another road user cannot see, or clearly see, the displayed image.

A known technique utilizes a pair of linearly polarized films to limit the visibility of a dashboard display device through the rear window of the vehicle. One of the two films is placed on the display device and the other is imbedded in the rear window. The transmission axes of the two films are nearly at a right angle. As a result, a beam of light can pass through one film but not both films. Thus, the display device is visible to an occupant of the vehicle but almost invisible to the driver in a succeeding vehicle.

However, such a technique has some drawbacks. For instance, problems can arise when an occupant wears polarized eyewear, which is common for mitigating sunlight glare. Lenses of the polarized eyewear can block the linearly polarized light transmitted through the rear window, or from the display. The occupant may have trouble viewing the display or seeing the outside through the rear window. This can be inconvenient. Worse still, if the occupant is the driver, accidents can occur due to the impaired rear-view vision.

Accordingly, there is a need for an improved technique of controlling light transmission, such as for limiting external visibility of an in-vehicle display.

SUMMARY OF THE INVENTION

In accordance with a first aspect of the present invention, there is provided a light transmission control system for a vehicle. The system comprises a combination of a display and a first polarizer. The combination is disposed in the vehicle and comprises linear polarizing means for linearly polarizing light. The first polarizer comprises an ellipticity increaser. The ellipticity increaser is configured and oriented with respect to the linear polarizing means such that light of at least one visible wavelength passing from the linear polarizing means through the ellipticity increaser has a first ellipticity of higher than 0.5. The system also comprises a second polarizer associated with a window of the vehicle. The second polarizer comprises an ellipticity adjuster and a linear polarizer. The ellipticity adjuster is oriented with respect to the linear polarizer such that light of the at least one visible wavelength passing from the linear polarizer through the ellipticity adjuster has a second ellipticity of higher than 0.5. The ellipticity increaser and the ellipticity adjuster are disposed between the linear polarizing means and the linear polarizer.

The ellipticity increaser and ellipticity adjuster are configured and oriented with respect to each other such that light of at least one visible wavelength passing from the linear polarizing means through the ellipticity increaser and the ellipticity adjuster to the linear polarizer has a polarization ellipse with a third ellipticity of less than 0.5, and a major axis of the polarization ellipse is substantially perpendicular to a transmission axis of the linear polarizer. The at least one visible wavelength may comprise at least one fourth of all visible wavelengths, such as all visible wavelengths. The third ellipticity may be less than 0.15. The display or the first linear polarizer may comprise the linear polarizing means. The linear polarizer may be a first linear polarizer, and the linear polarizing means may comprise a second linear polarizer. The transmission axis of the first linear polarizer may be substantially perpendicular to a transmission axis of the second linear polarizer. The ellipticity increaser may comprise a first wave retarder and the ellipticity adjuster may comprise a second wave retarder. The first wave retarder may have an optic axis at least substantially perpendicular to an optic axis of the second wave retarder, an identical polarity to that of the second wave retarder, and a retardance at least substantially equal to that of the second wave retarder. The first wave retarder may have an optic axis at least substantially parallel to an optic axis of the second wave retarder, an opposite polarity to that of the second wave retarder, and a retardance at least substantially equal to that of the second wave retarder. The first wave retarder may comprise a first quarter wave plate. The first quarter wave plate may have an optic axis at an angle of about 45° with respect to a transmission axis of the second linear polarizer. The second wave retarder may comprise a second quarter wave plate. The second quarter wave plate may have an optic axis at an angle of about 45° with respect to a transmission axis of the first linear polarizer. A quarter-wave plate may be a zero-order quarter-wave plate for the at least one visible wavelength. Each one of the first and second polarizers may be an achromatic polarizer for a plurality of visible wavelengths. At least one of the first and second polarizers may comprise a half wave plate and a quarter wave plate. At least one of the first and second polarizers may comprise a dispersion compensated quarter-wave plate. The first polarizer may be configured and oriented such that the light having the first ellipticity has a first handedness, and the second polarizer may be configured and oriented such that the light having the second ellipticity has a second handedness opposite to the first handedness. The ellipticity increaser and ellipticity adjuster may be configured and oriented with respect to each other such that an ellipticity of light which has been increased by the ellipticity increaser is at least substantially reduced by the ellipticity adjuster. At least one of the first and second ellipticities may be about 1, and the third ellipticity may be about 0. Each one of the first and second polarizers may comprise a circular polarizer. The combination may comprise a polarization rotator located between the display and the ellipticity increaser. The polarization rotator may comprise a rotator selected from a twisted nematic liquid crystal film or an achromatic half-wave plate. At least one of the ellipticity increaser and ellipticity adjuster may comprise a material selected from a polymer material, a liquid crystal material, a twisted nematic liquid crystal (TN-LC) material, a dispersion-compensated material, a uniaxially birefringent material, and a biaxially birefringent material. The first polarizer may comprise a c-plate adjacent the first wave retarder. The c-plate may have a retardance selected to reduce ellipticity variation between light transmitted from the display through the first wave retarder at different incident angles with respect to a surface of the first wave retarder. The first polarizer may comprise two c-plates, a quarter wave plate, and a half wave plate sandwiched between the c-plates. Each c-plate may have a retardance selected to reduce ellipticity variation between light transmitted from the display through the first polarizer at different incident angles with respect to a surface of the first polarizer.

In accordance with another aspect of the present invention, there is provided a light filter system for limiting visibility of a display in a vehicle through a window of the vehicle. The system comprises a first polarizer that covers the window and comprises a linear polarizer and a first wave retarder. The first wave retarder is located between the linear polarizer and the display. The first polarizer is configured and arranged for transmitting external light of at least one visible wavelength therethrough into the vehicle in a polarized state having a polarization ellipticity from 0.5 to 1. The system also comprises a second polarizer that covers the display and comprises a second wave retarder. The second polarizer is configured and arranged for transmitting light of the at least one visible wavelength emitted from the display therethrough in a polarized state having a polarization ellipticity from 0.5 to 1. The first and second polarizers are configured and aligned such that transmission of visible light emitted from the display through both of the first and second polarizers is limited, thereby reducing visibility of the display through the window. The at least one visible wavelength may comprise at least one fourth of all visible wavelengths, or all visible wavelengths. The third ellipticity may be less than 0.15. The first and second polarizers may be configured and aligned to minimize transmission of the visible light emitted from the display through both of the polarizers. The linear polarizer and the first wave retarder may be aligned to minimize transmission of the external light that is horizontally polarized therethrough. The linear polarizer may be a first linear polarizer, and the second polarizer may comprise a second linear polarizer located between the second wave retarder and the display. The second polarizer may be configured and arranged to optimize transmission of the visible light therethrough. The first wave retarder may comprise a first quarter wave plate. The second wave retarder may comprise a second quarter wave plate.

In accordance with a further aspect of the present invention, there is provided a method of controlling light transmission in a vehicle. The method comprises providing, in the vehicle, a combination of a display and a first polarizer. The combination comprises linear polarizing means for linearly polarizing light. The first polarizer comprises an ellipticity increaser. The ellipticity increaser is oriented with respect to the linear polarizing means such that light of at least one visible wavelength passing from the linear polarizing means through the ellipticity increaser has a first ellipticity of higher than 0.5. A second polarizer associated with a window of the vehicle is also provided, which comprises an ellipticity adjuster and a linear polarizer. The ellipticity adjuster is oriented with respect to the linear polarizer such that light of the at least one visible wavelength passing from the linear polarizer through the ellipticity adjuster has a second ellipticity of higher than 0.5. The ellipticity increaser and the ellipticity adjuster are disposed between the linear polarizing means and the linear polarizer. The ellipticity increaser and ellipticity adjuster are configured and oriented with respect to each other such that light of the at least one visible wavelength passing from the linear polarizing means through the ellipticity increaser and the ellipticity adjuster to the linear polarizer has a polarization ellipse with a third ellipticity of less than 0.5, and a major axis of the polarization ellipse is substantially perpendicular to a transmission axis of the linear polarizer. The linear polarizer may be a first linear polarizer, and the linear polarizing means may comprise a second linear polarizer. The ellipticity increaser may comprise a first quarter wave plate. The ellipticity adjuster may comprise a second quarter wave plate. The ellipticity increaser may comprise a first wave retarder and the ellipticity adjuster may comprise a second wave retarder. The first waver retarder may have an optic axis at least substantially perpendicular to an optic axis of the second wave retarder, an identical polarity to that of the second wave retarder, and a retardance at least substantially identical to that of the second wave retarder. The first wave retarder may have an optic axis at least substantially parallel to an optic axis of the second wave retarder, an opposite polarity to that of the second wave retarder, and a retardance at least substantially identical to that of the second wave retarder. Each quarter wave plate may be a dispersion compensated achromatic quarter-wave plate. The transmission axis of the first linear polarizer may be substantially perpendicular to a transmission axis of the second linear polarizer. The first quarter wave plate may have an optic axis at an angle of about 45° with respect to a transmission axis of the second linear polarizer, and the second quarter wave plate may have an optic axis at an angle of about 45° with respect to the transmission axis of the first linear polarizer. The combination may comprise a polarization rotator located between the display and the ellipticity increaser. The at least one visible wavelength may comprise at least one fourth of all visible wavelengths, such as all visible wavelengths. The third ellipticity may be less than 0.15.

In accordance with yet another aspect of the present invention, there is provided a kit for controlling light transmission in a vehicle. The kit comprises a first polarizer for covering a display of the vehicle. The first polarizer comprises a first linear polarizer and an ellipticity increaser. The ellipticity increaser is oriented with respect to the first linear polarizer such that light of at least one visible wavelength passing from the first linear polarizer through the ellipticity increaser has a first ellipticity of higher than 0.5. The kit also comprises a second polarizer for covering a window of the vehicle. The second polarizer comprises an ellipticity adjuster and a second linear polarizer. The ellipticity adjuster is oriented with respect to the second linear polarizer such that light of the at least one visible wavelength passing from the second linear polarizer through the ellipticity adjuster has a second ellipticity of higher than 0.5. The ellipticity increaser and ellipticity adjuster are configured so that, when the ellipticity increaser and the ellipticity adjuster are disposed between the first and second linear polarizers, they are capable of being oriented with respect to each other such that light of the at least one visible wavelength passing from the linear polarizing means through the ellipticity increaser and the ellipticity adjuster to the linear polarizer has a polarization ellipse with a third ellipticity of less than 0.5, and a major axis of the polarization ellipse is substantially perpendicular to a transmission axis of the linear polarizer.

In accordance with a further aspect of the present invention, there is provided a light transmission control system for a vehicle, which comprises first polarizing means associated with a display of the vehicle and second polarizing means associated with a window of the vehicle. The first polarizing means comprises first linear polarizing means for linearly polarizing light and ellipticity increasing means for increasing ellipticity of light. The ellipticity increasing means is oriented with respect to the first linear polarizing means such that light of at least one visible wavelength passing from the first linear polarizing means through the ellipticity increasing means has a first ellipticity of higher than 0.5. The second polarizing means comprises ellipticity adjusting means for adjusting ellipticity of light and second linear polarizing means for linearly polarizing light. The ellipticity adjusting means is oriented with respect to the second linear polarizing means such that light of the at least one visible wavelength passing from the linear polarizing means through the ellipticity adjusting means has a second ellipticity of higher than 0.5. The ellipticity increasing means and ellipticity adjusting means are disposed between the first and second linear polarizing means. The ellipticity increasing means and ellipticity adjusting means are configured and oriented with respect to each other such that light of the at least one visible wavelength passing from the first linear polarizing means through the ellipticity increasing means and the ellipticity adjusting means to the second linear polarizing means has a polarization ellipse with a third ellipticity of less than 0.5, and a major axis of the polarization ellipse is substantially perpendicular to a transmission axis of the second linear polarizing means.

In accordance with another aspect of the present invention, there is provided a vehicle that comprises a cab having a window, and any of the light transmission control system described above, where the system is mounted on the vehicle for controlling transmission of light through the window.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention.

DETAILED DESCRIPTION

Figure 1:
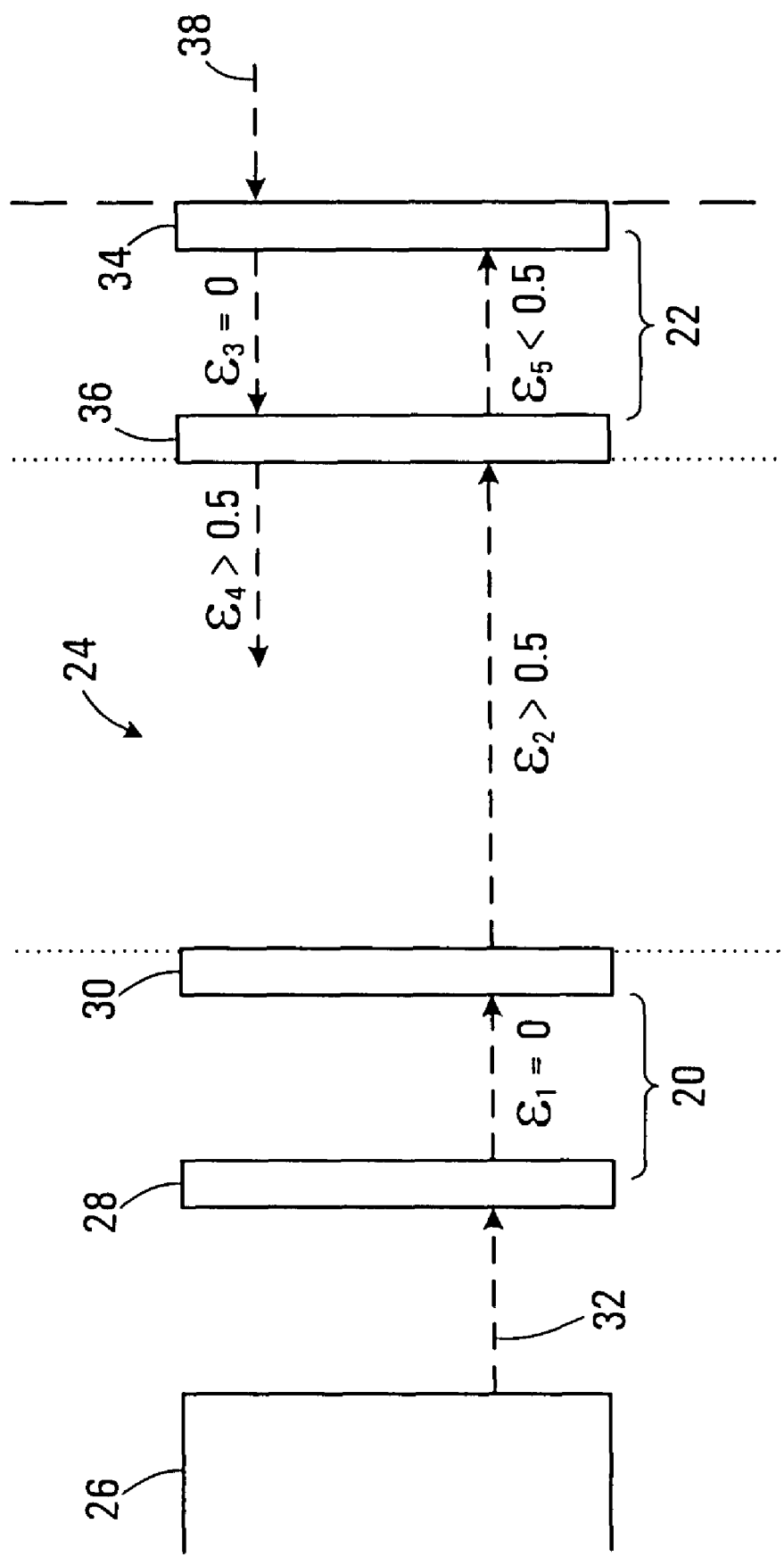
FIG. 1 is a schematic view of a light transmission control system, exemplary of an embodiment of the present invention.

In overview, transmission of light can be controlled with a pair of matched polarizers 20 and 22 which adjust the polarization and ellipticity ($\epsilon$) of light as it passes through the polarizers, as illustrated in FIG. 1. The ellipticity $\epsilon$ of a polarization ellipse refers to the absolute ratio of the lengths of the semiminor and semimajor axes of the polarization ellipse herein. The pair of polarizers 20 and 22 are disposed separate and apart from each other thus defining a viewing region 24 therebetween, as indicated by the dotted lines, relative to a light source such as display 26. Polarizer 20 may include an optional linear polarizer 28 and an ellipticity increaser 30.

Linear polarizer 28 linearly polarizes light 32 passing from display 26 therethrough, so the transmitted light 32 has an ellipticity ($\epsilon_1$) of about zero. Linear polarizer 28 and ellipticity increaser 30 are configured and oriented with respect to each other such that light 32 of at least one visible wavelength passing from linear polarizer 28 through ellipticity increaser 30 has a high ellipticity ($\epsilon_2$), such as higher than 0.5, and up to about 1. Polarizer 22 may include a linear polarizer 34 and an ellipticity adjuster 36. Light 38 passing through linear polarizer 34 is linearly polarized, thus having a low ellipticity ($\epsilon_3$) of about zero. Linear polarizer 34 and ellipticity adjuster 36 are configured and oriented with respect to each other such that light 38 of at least one visible wavelength passing from linear polarizer 34 through ellipticity adjuster 36 has a high ellipticity ($\epsilon_4$), such as higher than 0.5, and up to about 1. Ellipticity increaser 30 and adjuster 36 are disposed between the linear polarizers, and may be configured and oriented with respect to each other such that light 32 passing from linear polarizer 28 through ellipticity increaser 30 and adjuster 36 toward linear polarizer 34 has a polarization ellipse with a low ellipticity ($\epsilon_5$), such as less than 0.5, or less than 0.15, or about 0. A major axis of the polarization ellipse is substantially perpendicular to a transmission axis of linear polarizer 34. In one embodiment, each of light 32 and light 38 may include at least one fourth of all visible wavelengths. In another embodiment, each of light 32 and 38 may include all visible wavelengths. For a typical human eye, the visible wavelengths are from about 400 to about 700 nm. In some cases, the visible spectrum may be expanded to include wavelengths from about 380 to about 780 nm.

As can be understood, in this arrangement transmittance of light 32 through linear polarizer 34 is low and light 32 is at least partially blocked by linear polarizer 34. However, as light with a high ellipticity can substantially transmit through a linear polarizer in a similar manner to unpolarized light, an observer (not shown) in region 24 can see through each of polarizers 20 and 22, even when the observer wears linearly polarized eyewear. As can be appreciated, when $\epsilon_4$=1 or $\epsilon_2$=1, and $\epsilon_5$=0 for all visible wavelengths of light, the polarizers may have optimal performance. The light transmission control system may be used for various applications, such as for limiting the visibility of an in-vehicle display through a vehicle window, as will be further described below.

As can be appreciated, display 26 and polarizer 20 may be provided as a combination. In one embodiment of the combination, a linear polarizer may be integrated with display 26, and linear polarizer 28 may be omitted in polarizer 20. In another embodiment, display 26 may characteristically have an internal linear polarizing feature for emitting linearly polarized light, as will be further discussed below. In this case, a separate linear polarizer may not be necessary. In a further embodiment, polarizer 20 may be entirely integrated with display 26. For instance, display 26 may be constructed to emit polarized light having high ellipticities, such as circularly polarized light.

While the ellipticity ($\epsilon_4$) of light 38 passing from linear polarizer 34 through ellipticity adjuster 36 is high, it is not necessary that in all embodiments, all visible light passing from linear polarizer 34 through ellipticity adjuster 36 has an ellipticity higher than 0.5. For example, in one embodiment, all visible wavelengths may have ellipticity higher than 0.5. In a different embodiment, about 25% of visible wavelengths may have ellipticity higher than 0.5, and about 75% of visible wavelengths may have ellipticity less than 0.5.

As can be appreciated, the ellipticity of light affects its transmission through polarized eyewear, particularly when the polarized eyewear is rotating. In some embodiments, it is advantageous that light 38 include all visible wavelengths and $\epsilon_4$ is about 1, as the intensity variation due to rotation of polarized eyewear is minimal in such embodiments. However, this is not necessary in other embodiments, such as when some variation in transmitted intensity is tolerable. Further, when the incident light includes a broad range of wavelengths (broadband), the overall intensity variation may be small as the intensity variation of some different wavelengths may cancel each other. A visible effect of the wavelengths having different ellipticity may be an observable hue offset when viewed through polarized eyewear.

In some embodiments, optimal performance may be obtained when $\epsilon_5=0$ for at least one visible wavelength. In some embodiments, good performance may be achieved when $\epsilon_5$ is less than 0.15, and acceptable performance may be obtained when $\epsilon_5$ is less than 0.5, for at least some visible wavelengths.

Figure 2:
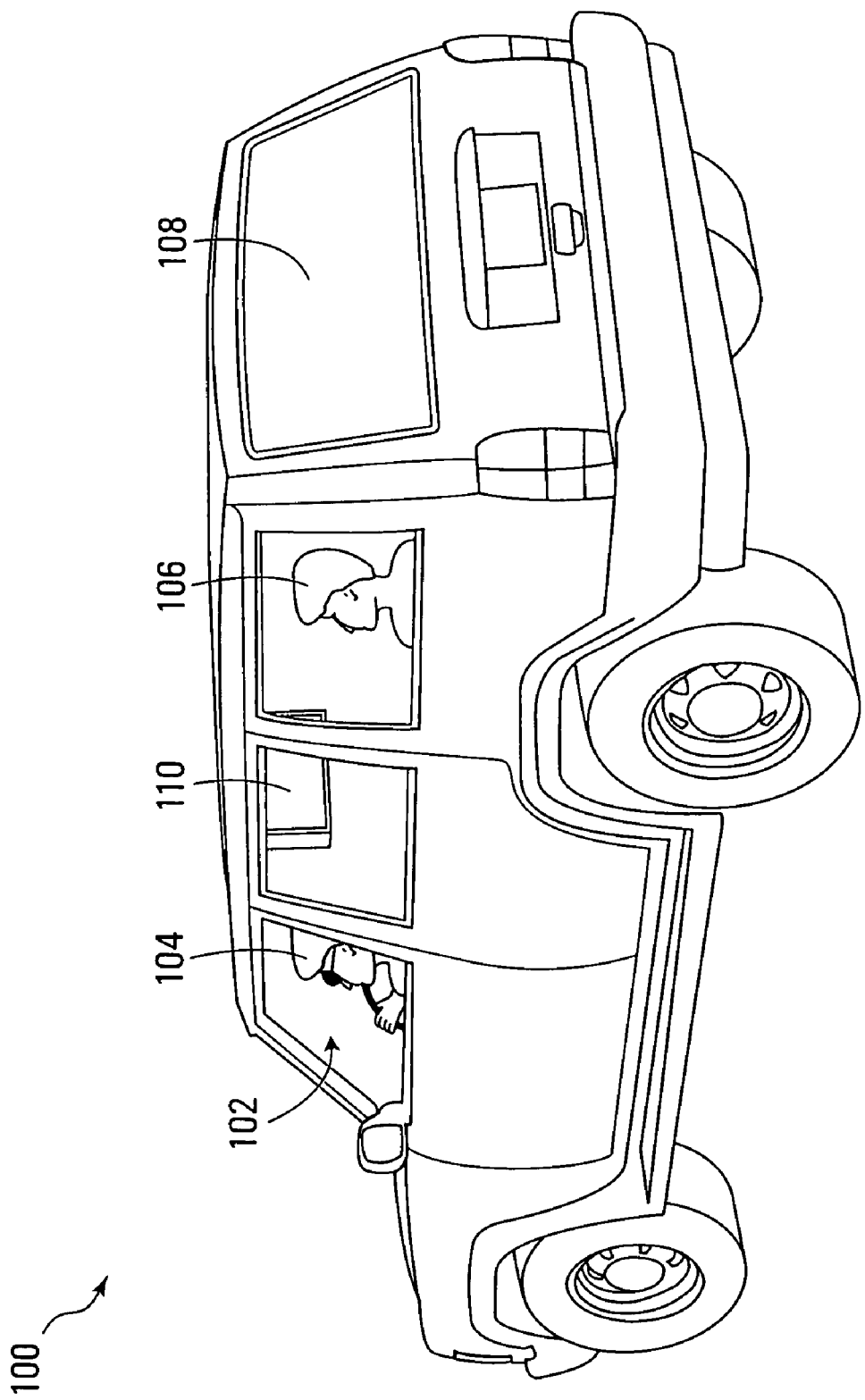
FIG. 2 is a perspective view of a vehicle having a window and an in-vehicle display device, exemplary of an embodiment of the present invention.

FIG. 2 illustrates a vehicle 100, exemplary of an embodiment of the present invention. While a sports utility vehicle (SUV) is shown in FIG. 2, vehicle 100 may be any type of conveyance for transporting people or other subjects. Vehicle 100 may have a cab 102 for housing an occupant, such as a driver 104 and one or more passengers 106. One or more windows, such as a rear window 108, may be provided for transmitting light into cab 102. A display device 110 (only partially shown) may be mounted inside cab 102 for viewing by an occupant such as rear-seat passenger 106.

An image displayed on display device 110 is clearly visible inside cab 102, but its visibility through window 108 is significantly reduced, as will be further described below with reference to FIGS. 2 to 10.

Figure 3:
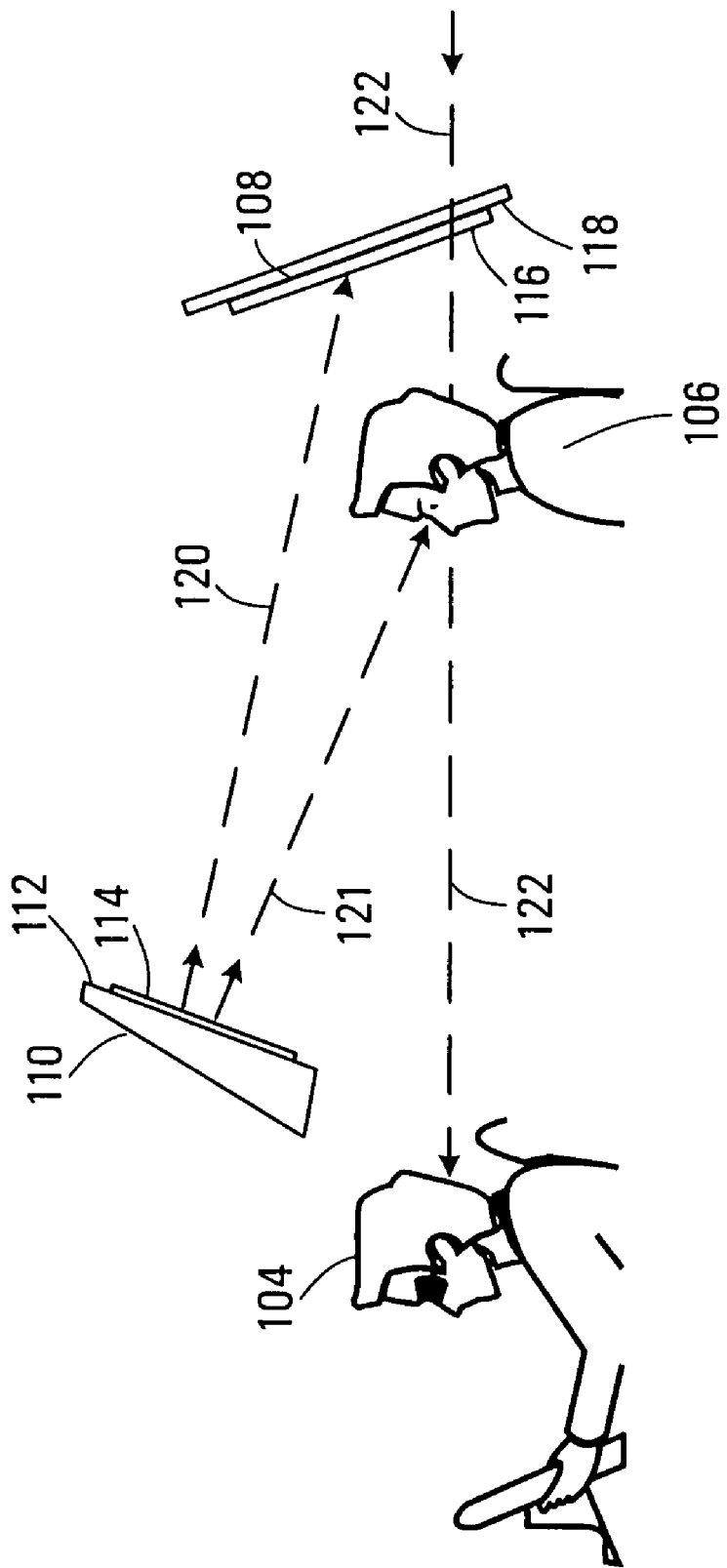
FIG. 3 is a side view of the display device and the window of the vehicle of FIG. 2, showing polarizers respectively attached thereto.

As illustrated in FIG. 3, display device 110 has a light source such as a screen 112 that emits visible light. The light source may emit polarized or unpolarized light. Screen 112 may be a liquid crystal display (LCD) screen or of a different type. A polarizer 114, which may be in the form of a film, at least partially covers screen 112, and may be attached to display device 110. Another polarizer 116, which may also be in the form of a film, at least partially covers window 108, and may be attached to a window glazing 118 of window 108. Polarizers 114 and 116 are selected and arranged/aligned such that beams of light emitted from screen 112 can be transmitted to window 108 (such as light beam 120) or to passenger 106 (such as light beam 121), and a light beam 122 of external light can be transmitted into cab 102 through window 108, but transmission of visible light emitted from screen 112 through window 108 is limited.

Figure 4:
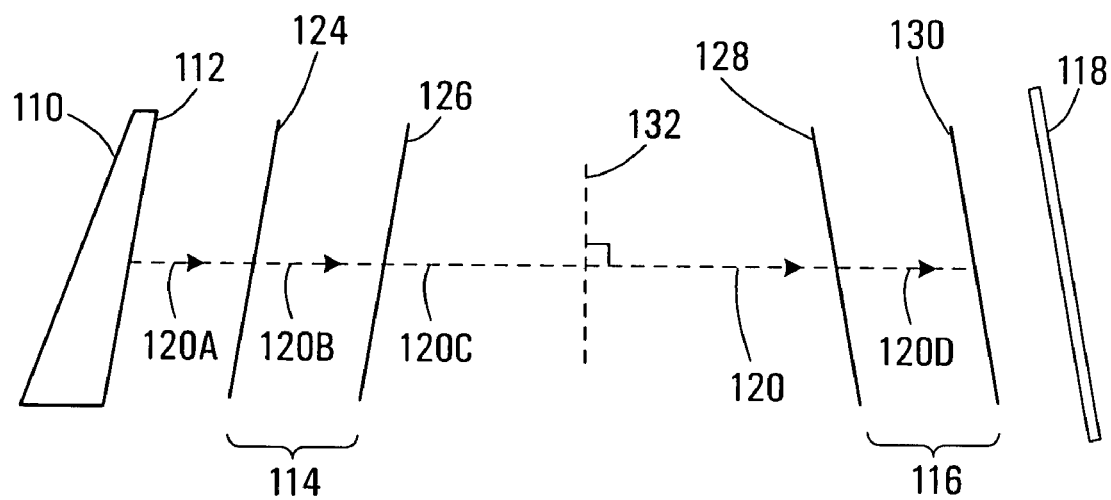
FIG. 4 is a partial exploded view of the display device and window shown in FIG. 3.

Exploded views of polarizers 114 and 116 are shown in FIG. 4. Polarizer 114 may be a composite polarizer including a linear polarizer 124 and a wave retarder 126 (as the ellipticity increaser). Polarizer 116 is also a composite polarizer including a wave retarder 128 (as the ellipticity adjuster) and a linear polarizer 130. Each polarizer may be in the form of a layer or film. As illustrated, linear polarizer 124 may be located between screen 112 and wave retarder 126, and wave retarder 128 may be located between wave retarder 126 and linear polarizer 130.

As shown, beam 120 may be blocked by linear polarizer 130. As can be appreciated and will become clear below, a visible component of beam 120 may be in different polarization states at different stages of transmission, as indicated by 120A through 120D. Different wavelength components may also be in different polarization states at a same stage. An arbitrary reference plane 132 normal to the propagation direction of beam 120 is also indicated in FIG. 4, for assisting the description of the alignment of the polarizers below.

Figure 5:
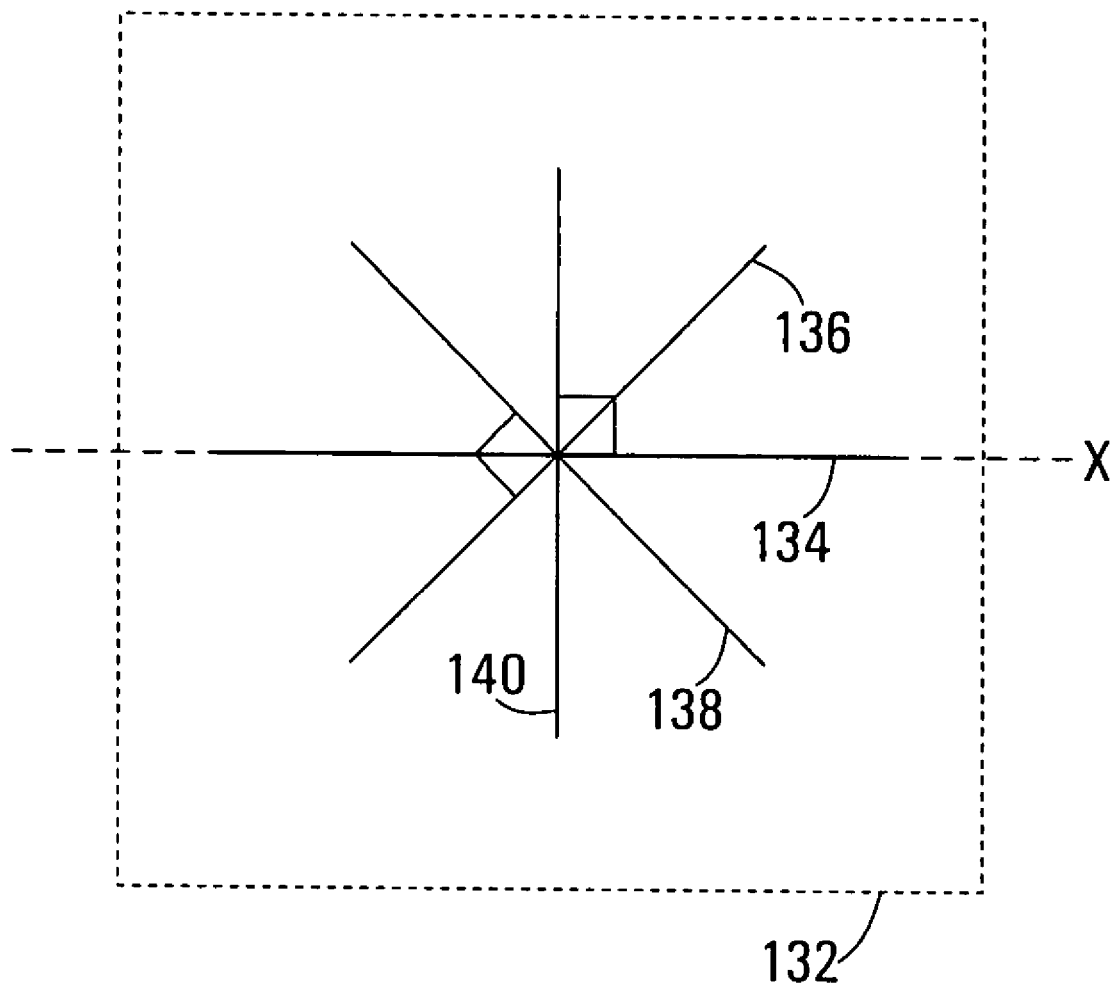
FIG. 5 is a schematic diagram showing the azimuth angles of various axes in the reference plane shown in FIG. 4.

FIG. 5 shows the azimuth angles of respective axes of the polarizers in reference plane 132. Specifically, the axis 134 corresponds to the transmission axis of linear polarizer 124, the axis 136 corresponds to the optic axis of wave retarder 126, the axis 138 corresponds to the optic axis of wave retarder 128, and the axis 140 corresponds to the transmission axis of linear polarizer 130. As can be understood, each polarizer axis and the direction of light propagation define a plane, which intercepts the reference plane. The straight line defined at the two intercepting planes is the projected axis on the reference plane. In the present context, an azimuth angle (sometimes called simply the azimuth) of a particular polarizer or wave retarder axis in a specified reference plane is the angle between a reference direction in the reference plane and the projected axis of that particular polarizer or wave retarder axis.

As shown, axes 134 and 140 may be orthogonal, or perpendicular, to each other, thus, their corresponding azimuth angles differ by 90°. Linear polarizers 124 and 130 in such an alignment are said to be cross-aligned. As can be understood, the axes may be substantially perpendicular to each other for substantially blocking light transmission. When axes 134 and 140 are substantially perpendicular to each other, the transmission axes of linear polarizers 124 and 130 are also substantially perpendicular to each other, even if the surfaces of linear polarizers 124 and 130 are tilted with respect to each other. The direction of axis 134 may be selected depending on the polarization state of light 120A emitted from screen 112. If light 120A (FIG. 4) is not linearly polarized, axis 134 may be arbitrarily aligned in any direction. If light 120A is linearly polarized, axis 134 may be aligned with the polarization direction of light 120A to optimize transmission through linear polarizer 124.

Also as shown, axes 136 and 138 for the wave retarders may be orthogonal, or substantially perpendicular to each other. As can be understood, when axes 136 and 138 are substantially perpendicular to each other, the transmission axes of wave retarders 126 and 128 are also substantially perpendicular to each other, even if the surfaces of wave retarders 126 and 128 are tilted with respect to each other. When the axes are orthogonal, the wave retarders are cross-aligned. Further, the azimuth angles of axes 134 and 136 may differ by 45°. In this case, the optic axis of wave retarder 126 (or 128) is at an angle of 45° with respect to the transmission axis of linear polarizer 124 (or 130). As can be appreciated, the angle may be about 45°. In other embodiments, the angle may be less or more than 45°. Further, as can be appreciated, the described angular relationships may vary when different directions of light propagation are considered, or when different areas of a curved polarizer are considered.

As can be appreciated, the alignment described above can optimize transmission of external light into the vehicle through polarizer 116 and window 108 and transmission of light emitted from screen 112 through polarizer 114, while minimizing transmission of light emitted from screen 112 through both polarizers 114 and 116. In a different embodiment, the values of the azimuth angles mentioned above may be altered. For instance, the azimuth angles of axes 134 and 136 may differ by a different value, such as in the range from 30° to 60°, or from −30° to −60°. The alignment may also depend on the polarities of the wave retarders. If the pair of wave retarders have opposite polarities of birefringence, their optic axes may be aligned in parallel, or substantially parallel, as will become clear below. Further, as will become clear below, if polarizers 114 and 116 are achromatic circular polarizers, then the angular relationships between axes 134 and 140, and 136 and 138 may vary, and it is not necessary that they are orthogonal or substantially orthogonal.

Display device 110 can be any type of display device and may be located anywhere in cab 102 where it is visible through window 108. For example, the display device may be part of an entertainment system such as TV, video player or gaming device, a monitor for computer, a control panel, or the like. The display device may include a cathode-ray-tube (CRT) device, LCD, plasma monitor, or the like. For instance, an LCD screen typically emits linearly polarized light which may have varying degrees of polarization. Display devices that emit unpolarized light include Suspended Particle Displays, Electroluminescent Displays, Plasma Displays, Light Emitting Diode Displays, Organic Light Emitting Displays, Vacuum Florescent Displays, Field Emitter Displays, CRTs, and the like.

The linear polarizers may be made in any suitable manner and with any suitable material, as can be understood by persons skilled in the art. In one embodiment, a linear polarizer may be formed of a drawn hydrophilic polymer film, such as a polyvinyl alcohol film, a partially formalized polyvinyl alcohol film or a partially saponified ethylene-vinyl acetate copolymer film. The polarizing film may contain one or both of iodine and dichromatic dye adsorbed on the film. In some embodiments, the polarizing film may have a transparent protective coating. One or both of the film surfaces may be protected with a protective coating. In a further embodiment, a linear polarizer may be formed from liquid crystals such as described by Yip, W. C. et al., "Photo-Patterned E-Wave Polarizer," Displays, 2001, vol. 22, pp. 27-32, the contents of which are incorporated herein by reference (referred to hereinafter as "Yip"). The linear polarizer may also include a suitable linear polarizer disclosed in U.S. Pat. No. 6,864,932 to Miyatake et al., issued Mar. 8, 2005, the contents of which are incorporated herein by reference (referred hereinafter as "Miyatake").

The wave retarders may be made in any suitable manner and with any suitable material for altering the ellipticity of light, such as by inducing phase-shift, as can be understood by persons skilled in the art. For instance, each wave retarder 126 or 128 may include a quarter-wave plate for a selected visible wavelength of light.

A wave retarder, such as a wave plate, is an optical device that induces a phase difference (retardation) between two orthogonal polarization components of a light wave. The phase difference, or phase shift as it is often called, may result from the two polarization components having different effective velocities within the retarder material. For example, wave plates may be made from a uniaxial birefringent material which is characterized by an optic axis and two indices of refraction. The index of refraction along the optic axis is called the extraordinary index, $n_e$, while the index of refraction in the plane perpendicular to the optic axis is called the ordinary index, $n_o$. The retardance of a retarder refers to the induced phase difference between the two polarization components along two eigen-axes. The term "wave retarder" is to be interpreted broadly herein and may include any optical device that can induce a phase shift between two orthogonal components of incident light.

In one embodiment, a wave retarder may be made of a single quarter-wave plate. Each quarter-wave plate may be uniaxially birefringent and thus have a single optic axis. Each of the quarter-wave plates may be an a-plate, where the optic axis is parallel to the plate surface. The pair of wave retarders may have various combinations of polarities of birefringence—they may both be negative or positive, or they may have opposite polarities. For purpose of illustration, it is assumed that they have an identical polarity. The wave plates have a suitable retardance.

In some embodiments, the quarter-wave plates may have an equal retardance. Two values of retardance are considered equal if they are substantially the same, such as with a relative difference less than 5%. In one embodiment, the retardance may be 140 nm. In another embodiment, the retardance may be about 127 nm. The retardance may be selected to reduce intensity variation due to rotation of observation angle when the observer is wearing polarized eyewear. For example, when the quarter-wave plate is a zero-order quarter-wave plate and its optic axis is arranged at 45° with respect to the transmission axis of the linear polarizer, calculations show that the intensity variation of transmitted light is minimal when the quarter-wave plate has a retardance of about 127 nm. In different embodiments, the retardance of the quarter-wave plates may be selected so that they are quarter-wave plates for a different wavelength of visible light. A quarter-wave plate may also be a quarter-wave plate for multiple wavelengths of visible light. In other embodiments, the quarter-wave plates may have different values of retardance. The retardance of a quarter-wave plate may be in a range from 80 nm to 190 nm, from 120 nm to 160 nm, or from 135 nm to 145 nm. The quarter-wave plates (such as in achromatic retarders) may also have an effective retardance that varies with wavelength when the retardance is measured in a unit of length. For instance, the retardance may be in the range from 60 nm to 140 nm at a wavelength of 400 nm and 100 nm to 240 nm at a wavelength of 700 nm, or from 80 nm to 120 nm at a wavelength of 400 nm and 150 nm to 200 nm at a wavelength of 700 nm.

For the purpose of illustration, it is assumed below that each quarter-wave plate in polarizer 114 or 116 has an equal retardance of 140 nm, and is thus a quarter-wave plate for the wavelength of 560 nm (green light). As can be appreciated, in this case, each polarizer 114, 116 may be configured as a circular polarizer for green light.

As can be understood, the retardance of a wave retarder is the difference in phase change between the extraordinary and ordinary electric field components of the transmitted light induced by the wave retarder when the light passes therethrough. The retardance of a wave plate may vary depending on the direction of light propagation relative to the plate surface. Unless otherwise specified, retardance values given herein are for a transmission direction that intercepts both polarizers 114 and 116 (such as a direction collinear to beam 120).

For a wave plate with flat surfaces, its retardance "δ" can be approximately calculated as:

$$\delta = (k\Delta n d \sin(\theta))/\cos(\phi^{SM}), \quad (1)$$

where $\Delta n=(n_e-n_o)$, which is the birefringence of the wave retarder material; "d" is the thickness of the wave plate; "θ" is the angle between the incident light propagation direction and the optic axis; and "φ" is the angle between the light propagation direction and the direction that is normal to the wave retarder surface. As can be appreciated, the two orthogonal components may propagate within the material in slightly different directions due to refractive effects. However, such effects are ignored In Equation (1). Thus, the accuracy of Equation (1) may decrease with increasing value of Δn. It is also noted that Equation (1) may be normalized to a specific wavelength (λ). For some retarders, δ is dependent on the actual wavelength and k=2π/λ. The suitable thickness of a wave plate may be calculated from Equation (1) for given retardance, wavelength, and the relevant angles. A zero-order quarter wave plate induces a phase shift of π/2 (¼ of 2π) for the specified wavelength(s). Generally, an nth-order wave plate induces a phase shift of 2πn+x, where "n" is an integer, and "x" is the effective phase shift and $0 \leq x < 2\pi$. Possible values of x include ½π (quarter-wave), π (half-wave), ³⁄₂π, or the like.

It is noted that the retardance stated by a manufacturer for a given wave plate may be related to a given wavelength and incident angle. The actual retardance for an arbitrary wavelength and incident direction of light may be different from the manufacturer's stated retardance.

Wave retarders may be made of polymeric materials. Broadband quarter-wave plates may also be made from dispersion compensated materials, such as those described in U.S. patent application No. 2002/0169267 to Minakuchi et al., published on Nov. 14, 2002, the contents of which are incorporated herein by reference (referred to hereinafter as Minakuchi).

Exemplary suitable materials and manufacturing processes for making the linear polarizers and wave retarders are disclosed in, e.g., U.S. Pat. Nos. 6,864,932, and 6,882,384 to Sharp, issued Apr. 19, 2005, the contents of which are incorporated herein by reference. Suitable linear polarizers and wave retarders, or the materials for forming them, may be obtained from, e.g., Ace Digitech™, Nitto Denko™, Optimax™, Polatechno™, Sanritz™, ColorLink™, PPG™, and Sumitomo Chemical™.

Other suitable materials for forming a wave retarder, or other types of ellipticity increasers and adjusters, may include biaxially birefringent materials, dispersion-compensated materials, twisted nematic liquid crystal (TN-LC) materials, and the like, some of which will be further described below.

The linear polarizer and wave retarder layers may be laminated together or laminated onto a common substrate (not shown), as can be understood by persons skilled in the art.

Window glazing 118 may be transparent and made of any suitable material such as glass, polycarbonate, acrylic, or the like. The material may be isotropic or slightly anisotropic. For instance, tempered glasses may be used in window glazing 118. Tempered glasses may be slightly anisotropic (having varying birefringence in different direction) due to the tempering. In some embodiments, window glazing 118 may be tinted.

With reference to FIGS. 3 to 6, in use, beam 120 is transmitted from screen 112 to window 108. At different stages of transmission, the transmitted light is in a different polarization state. Visible light 120A is emitted from screen 112. For the purpose of illustration, it is assumed that light 120A is unpolarized as shown. However, it should be understood that light 120A may have a different polarization state and, in particular, may be linearly polarized. As will be further discussed below, if light 120A is linearly polarized, linear polarizer 124 may be omitted or it should be properly aligned to allow at least some light 120A to pass through.

Figure 6:
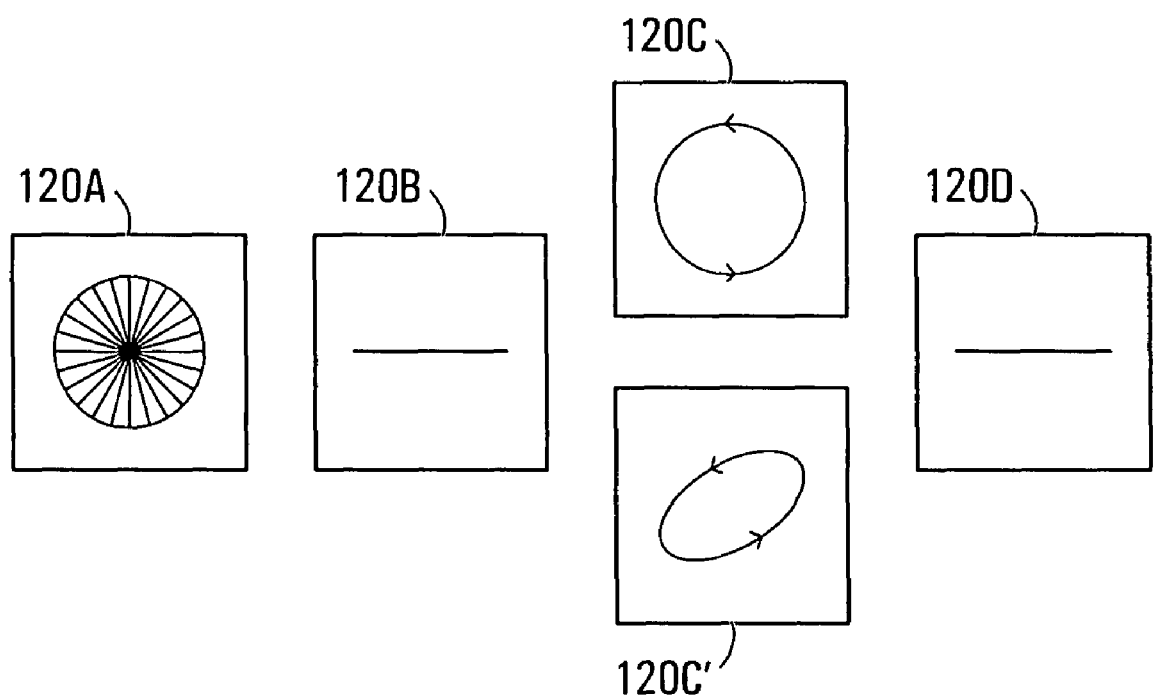
FIG. 6 are schematic diagrams of polarization states of a beam of light.

Regardless of the polarization state of emitted light 120A, light 120B transmitted through linear polarizer 124 is linearly polarized in the direction along the transmission axis 134, as illustrated in FIG. 6. As such, light 120B is in a polarized state having a polarization ellipticity of zero (0), or about 0.

The linearly polarized light 120B is incident on wave retarder 126 and transmitted therethrough as light 120C (or 120C'). Wave retarder 126 induces a phase shift in the two electric field components of the light wave, thus increasing the ellipticity of light transmitted therethrough (such beam 120). If the wavelength of transmitted light is 560 nm, the phase shift is 90° and light 120C is circularly polarized as illustrated. As such, light 120C is in a polarized state having an ellipticity of one (1), or about 1. If the wave retarder is chromatic, the phase shift would be dependent on the wavelength. Thus, for different wavelengths, the increase in ellipticity may be different. If the wavelength of transmitted light is different, the transmitted light, denoted as 120C', may be in an elliptically polarized state, as shown. For example, if the wavelength is 400 nm, then the phase shift is 126° and the ellipticity is about 0.5. As can be appreciated, elliptically polarized light with an ellipticity lower than one (1) may also result if transmission axis 134 of linear polarizer 124 and optic axis 138 of wave retarder 128 are not aligned at the 45° angle, as the initial polarization would not be resolved into two orthogonal components of an equal amplitude. It is noted that elliptically polarized light can have a broad meaning and a narrow meaning, depending on the context. In the broad sense, it includes linearly and circularly polarized light. In the narrow sense, it refers to polarized light that is neither linearly nor circularly polarized, i.e. having an ellipticity between zero and one. Unless otherwise stated, elliptically polarized light is used in its narrow sense herein, and does not include linearly or circularly polarized light. For clarity, it is noted that a linearly or circularly polarized light can still be described by reference to its ellipticity.

Light 120C (or 120C') is then incident on wave retarder 128 and transmitted therethrough as light 120D. As wave retarders 126 and 128 have identical polarity and equal retardance and are cross-aligned, wave retarder 128 induces a phase shift that has the effect of canceling the phase shift induced by wave retarder 126, and restoring the ellipticity of light 120D to the same value as that of light 120B. Thus, the transmitted light 120D is again linearly polarized with the same polarization direction as that of light 120B.

As can be appreciated, since the polarization direction of light 120D is perpendicular, or substantially perpendicular, to the transmission axis of linear polarizer 130, light 120D is substantially blocked by linear polarizer 130. As can be understood, linear polarizer 130 has a high extinction coefficient for light 120D. For example, the extinction ratio of light 120D can be as high as about 1,000:1. Test results show that the extinction ratio can be as high as about 4,440:1 for green light. Depending on the application, in some embodiments, the extinction ratio should be at least about 8:1 in order to obtain satisfactory results.

With reference to FIG. 3, conveniently, and similar to light 120C, light 121 transmitted through composite polarizer 114 is also circularly or elliptically polarized. Thus, an image displayed on screen 112 is clearly visible to passenger 106, even if passenger 106 wears linearly polarized glasses such as polarized sunglasses.

Likewise, light beam 122 transmitted from outside the vehicle through window 108 and composite polarizer 116 has a circularly or elliptically polarized state, which will therefore be visible to passenger 106 and driver 104 even if they wear linearly polarized glasses. It can be appreciated that light beam 122 transmitted through wave retarder 128 (FIG. 4) has a different handedness than light 120C. As can also be appreciated, if external light is completely linearly polarized in a direction perpendicular to the transmission axis of linear polarizer 130, it will be blocked by linear polarizer 130. However, as external light is normally unpolarized or randomly polarized, only about 50% light blockage would occur in most applications. Thus, the driver or any passenger can see through window 108. Even when they wear polarized sunglasses, vision through window 108 is still retained to a large extent. By comparison, the tinted rear window of a typical "dark-tail" minivan or SUV currently available on the market blocks up to about 87% of external light, much more than in the present embodiment.

Conveniently, in some embodiments, linear polarizer 130 may be aligned to minimize the transmission of reflected sunlight or headlight glare from outside. Sunlight glare that is reflected from water (or other reflecting horizontal surfaces) has a predominant horizontal polarization. For this reason, the transmission axis of polarized eyewear is typically aligned vertically. In some embodiments, transmission axis 140 of linear polarizer 130 may be aligned vertically to minimize transmission of reflected sunlight therethrough. Other transmission or optical axes may then be oriented accordingly.

As now can be appreciated, some modifications can be made to the embodiment described above and still achieve the same or a similar result—reducing visibility of the display through the vehicle window but allowing an occupant in the cab to see the outside, even when the occupant wears polarized eyewear. The embodiment can also be modified without removing the benefit that an occupant wearing polarized eyewear can conveniently view the display.

For instance, in different embodiments, a polarizer may be detached from the display screen/window but mounted proximate or adjacent the screen/window. In yet other embodiments, a polarizer layer or the entire polarizer may be integrated into the display or the window glazing. For example, in an LCD monitor, there may be a built-in polarizing feature so that the light emitted from the screen surface is already linearly polarized. In such a case, the internal linear polarizing mechanism may serve as a linear polarizer corresponding to linear polarizer 124. In other words, a separate linear polarizer may be omitted in polarizer 114. The composite polarizer covering the window, corresponding to polarizer 116, may also be integrated or imbedded into the window glazing. Wave retarder 128 and linear polarizer 130 may be bonded together or may be separated, and may be located either inside or outside window glazing 118. For example, wave retarder 128 may be located on the inside of window glazing 118 and linear polarizer 130 on the outside of glazing 118. Each of the polarizers or any of its components may be removable. For instance, in some embodiments, the polarizer covering the window may be incorporated into a window curtain, blind, or screening device, such as a pull-down curtain. The polarizer covering the display may also be provided as a removable screen shield or filter. In yet other embodiments, a polarizer layer or film may be coated on the display screen or the vehicle window.

In different embodiments, the alignment of the various polarizing components may be varied. As can be appreciated, it is not necessary that all the polarizer components are perfectly aligned as illustrated in FIG. 6. While the performance of the light filter system may vary, small misalignment may be tolerable and even large deviation may be acceptable depending on the application or embodiment (see the test results below). While the transmission intensity of a linearly polarized light through a linear polarizer is dependent on the alignment of the polarization direction of incident light and the transmission axis of the linear polarizer, a small degree of misalignment may not significantly reduce the extinction ratio.

It can also be readily understood that the alignment of the optic axis of a wave retarder with the transmission axis of its associated linear polarizer can affect the polarization state of the transmitted light. For example, if the optic axis (such as axis 136) is perpendicular or parallel with the transmission axis (such as axis 134), there will be no phase shift and the transmitted light (such as light 120C) will remain in the polarization state of the incident light (such as light 120B). Thus, this should be normally avoided and, in general, it will be apparent that adjusting the alignment of the various polarizing components can affect the polarization state of the transmitted light at various stages, and the overall transmittance. In some applications, the polarizer components may be aligned to maximize the overall transmission of light 120A through polarizer 114 (and any linearly polarized sunglasses worn by a viewer in the vehicle), and minimize transmission of light 120C through polarizer 116, as illustrated above. In other applications, the components may be aligned to allow different levels of transmission.

As discussed above, it is not necessary that light 120C is in a circularly polarized state. As can be appreciated, light 120C may include a continuum of different visible wavelengths, the polarization ellipses of which may have a continuum of ellipticities. It may be sufficient that at least some of those wavelengths have a high ellipticity, such as higher than 0.5. In some embodiments, the ellipticity for some wavelengths may be higher than 0.5 and the ellipticity for some other wavelengths may be lower than 0.5. For example, in an embodiment employing chromatic first-order quarter-wave plates for 476 nm (retardance of 595 nm), the ellipticity may be higher than 0.5 for about 25% of the visible wavelengths from 400 nm to 700 nm. As can be understood, light of higher polarization ellipticity may be more compatible with polarized eyewear. A sufficient extinction ratio may be achieved when the wave retarders or phase shifters are matched and arranged so that at least a sufficient portion of light transmitted therethrough and arriving at linear polarizer 130 has a sufficiently low ellipticity with a polarization orientation orthogonal, or close to orthogonal, to transmission axis 140 of linear polarizer 130.

A pair of wave retarders may be matched in different manners to offset the induced phase shift and change in ellipticity. The wave retarders may have different retardance, or different polarities. When the two matching wave retarders have different polarities, such as when one has a negative birefringence and the other has a positive birefringence, the optic axes of the wave retarders may be aligned with optic axes in parallel, instead of orthogonal to each other. When two wave retarders with different polarities but the same absolute retardance are aligned in parallel, the phase shifting effects of the wave retarders also cancel each other, as wave retarders 126 and 128 do.

When the pair of wave retarders have different retardance, the transmitted light 120D may not be linearly polarized. However, as discussed above, as long as the polarization ellipticity of the transmitted light 120D is sufficiently low, good extinction can still be achieved. In some embodiments, when the difference in retardance is less than 40 nm, satisfactory extinction may be obtained. In some embodiments, it may be sufficient if the increased ellipticity (increased by the ellipticity increaser or the wave retarder associated with the display) is substantially restored by the ellipticity adjuster or the wave retarder associated with the window.

The retardance of each individual wave retarder may also vary, within certain limitations depending on the application. As can be appreciated, while true zero order wave retarders (such as wave retarders 126 and 128) may be advantageous in some embodiments such as in wide angle transmission applications, in some embodiments, compound zero-order or higher order retarders may be used. In particular, if each individual wave retarder is achromatic, then the order of each individual wave retarder may be different.

As can be understood, while many wave retarders are chromatic, it is possible to provide an achromatic polarizer that can transmit linearly polarized light of different wavelengths in the same, or substantially the same, polarization state. For example, U.S. Pat. No. 6,025,958 to Yamaoka et al., issued Feb. 15, 2000, the contents of which are incorporated herein by reference (hereinafter referred to as "Yamaoka"), describes a circular polarizer for converting light of different wavelengths to circularly polarized light. In some embodiments, achromatic polarizers may be advantageous. Achromatic wave retarders such as bi-crystal achromats, Pancharatnam achromats and dispersion-compensated achromats such as those described in Minakuchi may be used for forming achromatic polarizers or wave retarders.

Other types of wave retarders or wave plates other than a-plates may be used. For example, the optic axis of a wave plate (such as wave retarder 128) may be tilted with reference to the plate surface. The optic axis may be tilted so that it is perpendicular to the propagation direction of incident light from the display device. Therefore, o-plates, where the optic axis is oblique to the plane of the plate surface, may be used in place of a-plates.

The display device may be mounted under the roof of cab 102, as illustrated in FIG. 2, or located elsewhere in cab 102 such as on the dashboard, or on the back of a headrest. The display screen may be rear facing or facing another direction. The display device may be positioned for viewing by any occupant of the vehicle including the driver. The display device may be affixed to the vehicle, or may be portable, and may have an adjustable screen position. As can be appreciated, if the position of polarizer 114 is changed (e.g. tilted) with respect to polarizer 116, then light beam 120 may be affected differently. However, such change may be acceptable depending on the application. The configuration and orientation of the polarizers may be optimized for a particular relative position of polarizer 114 with respect to polarizer 116.

More than one of the windows of the cab may be covered with a polarizer similar to polarizer 116. The construction of different polarizers may vary for different windows.

One or more additional optical components may also be provided in the light filter system to improve its performance.

Figure 7:
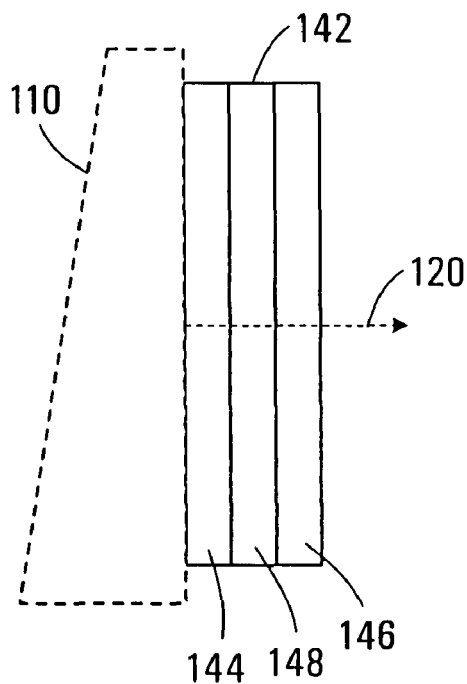
FIG. 7 is a side plan view of a composite polarizer.

For instance, FIG. 7 illustrates a variant of polarizer 114 (FIG. 3) for covering display device 110: composite polarizer 142. As illustrated, composite polarizer 142 includes a linear polarizer 144, a wave retarder 146, and a polarization rotator 148 interposed therebetween. Linear polarizer 144 and wave retarder 146 may be similar in construction to linear polarizer 124 and wave retarder 126 respectively, but they may be aligned differently as will become apparent below.

Polarization rotator 148 can transmit linearly polarized incident light in a linearly polarized state having a different polarization orientation. Thus, the effect of passing a linearly polarized light through polarization rotator 148 is that the polarization direction is rotated by a selected degree.

As can be appreciated, with such a polarization rotator, the transmission axis of linear polarizer 144 may be aligned in any way relative to the optic axis of wave retarder 146, so long as a suitable polarization rotator 148 is used to provide the right amount of rotation of the light polarization. Similarly, when the display emits linearly polarized light and the linear polarizer 144 is omitted, polarization rotator 148 may be used to properly align the polarization direction of incident light with the optic axis of wave retarder 146. Such a filter system may be convenient to use, such as can be easily adapted to work with different display devices that emit lights with different polarization directions.

Further, multiple polarization rotators with different degrees of polarization rotation may be provided, such as for use with different display devices. The amount of polarization rotation induced by a particular rotator may be selected to match a corresponding display device. When a display device is installed in the vehicle, its corresponding polarization rotator may be included in the polarizer used to cover this particular display device. This way, the configuration of the rest of the light filter system can remain unchanged when different or multiple display devices are used. To accommodate a new display device, only the polarization rotator may need to be replaced. Where multiple display devices are installed in the cab of the vehicle, they can each have a covering polarizer that matches the same polarizer that covers the window. Further, the same filter films may be used in different vehicles which may have different display devices.

As now can be appreciated, in a different embodiment, polarization rotator 148 can be disposed upstream of linear polarizer 144, instead of downstream of it. In another embodiment, linear polarizer 144 may be integrated with the display device. Further, more than one polarization rotators may be provided for gradually rotating the polarization direction of the light. The total rotation of polarization may be from 0 to 180°.

A polarization rotator may include a film made of a TN-LC material, which may be commercially available from Nippon Oil Corporation™, Ace Digitech, or Meadowlark Optics. Suitable TN-LC materials and their manufacture processes are also described in U.S. Pat. No. 5,206,752 to Itoh et al., issued Apr. 27, 1993, and U.S. Pat. No. 5,602,661 to Schadt et al., issued Feb. 11, 1997, the contents of each one of which are incorporated herein by reference.

TN-LC materials are optically anisotropic and have refractive indices that vary with the direction of light propagation and polarization. One refractive index in a TN-LC film corresponds to its extraordinary refractive index ($n_e$) and another refractive index corresponds to its ordinary refractive index ($n_o$). The effective refractive indexes of a TN-LC film may vary depending on the orientation of the nematic liquid crystal molecules with respect to the film surface. It may be advantageous in some applications to use a TN-LC film wherein the liquid crystal molecules are minimally tilted relative to the film surface for the required rotation of polarization. As can be appreciated, an optical characteristic of a TN-LC film is its ($\Delta n \cdot d$) product, where $\Delta n = n_e(\theta) - n_o$, and d is the thickness of the film. The angle ($\theta$) is the average tilt angle between the film surface and the liquid crystal molecules. As can be understood, in general, a thin TN-LC film transmits incident linearly polarized light in a circularly or elliptically polarized state. However, when the value of the ($\Delta n \cdot d$) product is much larger than a given wavelength, the given wavelength of light is transmitted in a polarized state having an ellipticity of close to 0, which is variously known as the Maugnuin limit, the waveguiding limit, or the adiabatic limit. When the ($\Delta n \cdot d$) product is sufficiently large, such as when it can be considered as close to the Mauguin limit for all visible wavelengths, the TN-LC film can achromatically rotate linearly polarized light. In practice, to be used as a polarization rotator, it may be sufficient that the ($\Delta n \cdot d$) product of the film is larger than 2 microns. To use a TN-LC film to rotate the polarization of an incident beam of light, the input directors of the film may be aligned with the initial polarization of the incident light, such as being orthogonal or parallel.

In an exemplary embodiment, polarization rotator 148 may include a TN-LC film having a thickness from 0.002 to 1 mm.

Another possible polarization rotator is a half-wave plate. Some half-wave plates are chromatic, where the polarization ellipticity of transmitted light is dependent on its wavelength. Some half-wave plates are achromatic, where the rotated angle of polarization and polarization ellipticity is about the same for a wide range of wavelengths. Achromatic half-wave plates, also referred to as broadband half-wave plates, may be advantageous in many applications. The functions, implementation and manufacture of half-wave plates for use in embodiments of the present application can be understood by persons skilled in the art. For example, a broadband half-wave plate may be produced as described by Yamaoka.

As alluded to earlier, different embodiments of wave retarder 126 (or 128) may be implemented to provide broadband transmission or wide-angle viewing, or both. In this regard, additional optical elements may be added. For example, the viewing angle may be improved using additional c-plate wave retarders, as described in Hong, Qi et al, "Designs of wide-view and broadband circular polarizers," Optics Express, 2005, vol. 13, pp. 8318-8331, the contents of which are incorporated herein by reference (hereinafter referred to as "Hong"). As used herein, a viewing angle refers to the angle relative to the direction that intercepts screen 112 and window 108 (such as a direction collinear to light beam 120).

Figure 8:
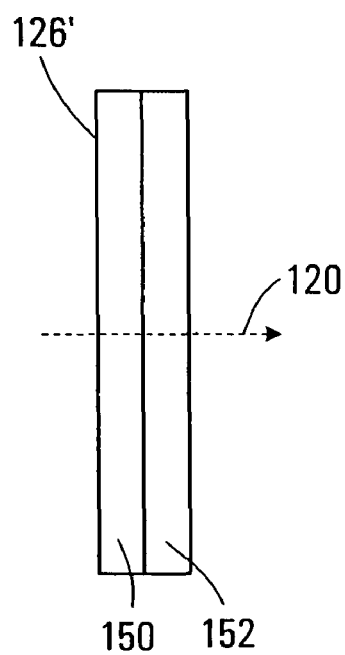
FIGS. 8 to 10 are side plan views of different wave retarders.

FIG. 8 illustrates a different embodiment of wave retarder 126. In this embodiment, the wave retarder 126' includes a quarter-wave plate 150 and a c-plate 152 disposed downstream of quarter-wave plate 150 in terms of light beam 120. Quarter-wave plate 150 may be selected, manufactured, configured, and aligned as described above for wave retarder 126. A c-plate is a wave retarder whose optic axis is normal to its surface plane. C-plate 152 may be a uniaxial c-plate. C-plate 152 may have a retardance selected to reduce variation in ellipticity of light passing through quarter-wave plate 150 at different incident angles with respect to a surface of quarter-wave plate 150, so as to increase a viewing angle of the display through quarter-wave plate 150. Wave retarder 126' may be useful, such as when display device 110 has a large tilt angle or different display devices with different tilt angles are to be used. For example, in one embodiment, the quarter wave plate may have a retardance of 140 nm and the c-plate may have a retardance of 60 nm. The retardance may be selected according to the method described in Hong. Suitable c-plates can be readily designed and manufactured by persons skilled in the art. For instance, a film made of cellulose triacetate (CTA) or tri-acetyl-cellulose (TAC) may have suitable c-plate birefringence properties. Such films may be commercially obtained from, e.g., Island Pyrochemical Industries™ (IPI), Konica™, Eastman™, Grafix™ Plastics, and Fuji™ Film.

As can be appreciated, inclusion of a c-plate in the polarizer covering the display device may be beneficial when the display screen has variable tilt angles. As mentioned, the use of c-plate may provide a wide viewing angle of the display. It may also reduce light leakage at linear polarizer 130 (FIG. 4). As discussed above, phase-shift in a wave retarder may depend on the incident direction of the incident light. As a result, light from the display traveling along different directions may end up in different polarization states when it arrives at linear polarizer 130. Thus, light leakage can occur. With a properly selected c-plate, the effect of incident angle on the resulting phase shift may be reduced or minimized. Therefore, a more uniform phase shift and ellipticity change may be obtained over a wide range of incident angles. As light arriving at linear polarizer 130 has more uniform polarization, light leakage is reduced.

In a different embodiment, the composite polarizer covering window 108 may also include a c-plate. With such a composite polarizer, the window may have a more uniform appearance when viewed from different angles through polarized eyewear.

Figure 9:
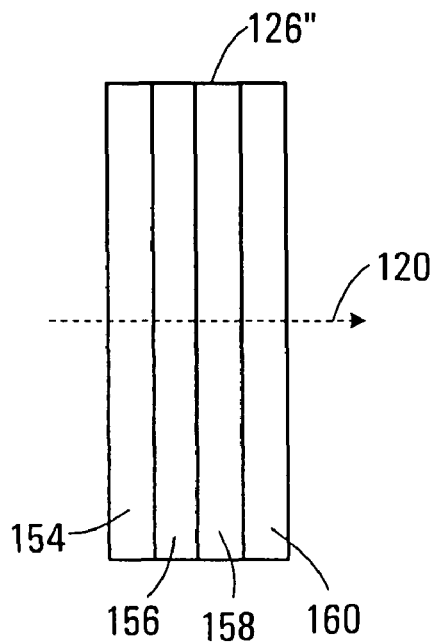

FIG. 9 illustrates a different embodiment of wave retarder 126. In this embodiment, the wave retarder 126" includes a half-wave plate 154, an optional first c-plate 156, a quarter-wave plate 158, and an optional second c-plate 160. The two c-plates 156 and 160 may sandwich quarter-wave plate 158 between them. The light propagation direction is generally indicated by light beam 120.

The wave plates 154 and 158 are aligned so that the difference between the azimuth angles of half-wave plate 154's optic axis and axis 134 in reference plane 132 is $\psi$, either clockwise or counter-clockwise, and the azimuth angles of the optic axes of the half- and quarter-wave plates in the surface plane of the polarizer film differ by $\psi+45°$. Thus, the difference between azimuth angles of the optic axis of quarter-wave plate 158 and axis 134 is $2\psi+45°$. The absolute value of $\psi$ may vary, and may be selected based on the wavelength dispersion properties of wave plates 154 and 158 to provide an achromatic polarizer that can transmit light of different wavelengths with high ellipticity, such as circularly (or substantially circularly) polarized light. In some embodiments, $\psi$ may be from 10° to 20°, such as being 10° or 17.5°. The half-wave and quarter wave plates may be made and configured as described, for example, in Yamaoka, to provide achromatic polarization of visible light. Polarizer 114 may be configured as an achromatic circular polarizer for selected wavelength(s) of light, where the transmitted light from the display has a particular handedness (right or left). Wave retarder 128 may be configured in a similar manner with respect to axis 140, such that wave retarder 128 transmits different wavelengths of light with a low ellipticity and a major axis substantially perpendicular to axis 140. Polarizer 116 thus substantially extinguishes light 120C regardless of the angular relationship between axes 134 and 140. In-bound light in a direction collinear to light beam 120 is transmitted through polarizer 116 with a low ellipticity, such as about 0, and a handedness that is opposite to that of light 120C. Alternately, wave retarder 128 may be configured as an achromatic quarter-wave plate, with axis 138 configured at substantially 45° (in the same direction as $\psi$) with respect to axis 140 to produce an achromatic polarizer 116 that substantially extinguishes light 120C.

The retardance of the first and second c-plates 156 and 160 may be selected to respectively compensate the half-wave and quarter-wave plates 154 and 158, so that wave retarder 126" provides wide-angle viewing of the displayed image, such as in a manner similar to that described in Hong. As can be appreciated, the permitted viewing angle may depend on the type of the display device as well as on the functionality of the polarizers. In some embodiments, viewing angles as high as 85° may be achieved.

As will be understood, when c-plates are provided as described above, the alignment of various optical components may be conveniently carried out. For instance, in such a case, the various axes may be aligned with reference to a plane that is parallel to the polarizer film surface, instead of reference plane 132 which is normal to the light propagation direction.

In some embodiments, such as when wide-angle viewing is not important, the c-plates may be omitted and the wave retarder may comprise a quarter wave plate and a half wave plate aligned as discussed above for achromatic retardation.

Figure 10:
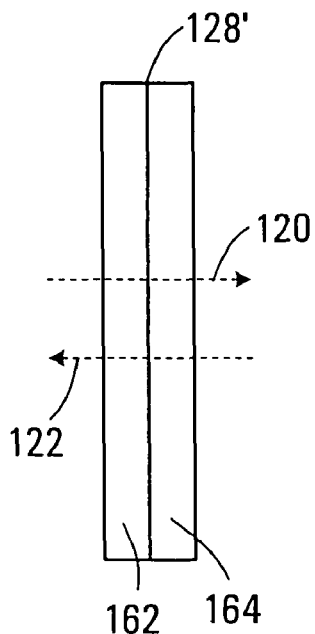

As illustrated in FIG. 10, a different embodiment of wave retarder 128, the wave retarder 128', may also be used to cover window 108, such as in combination with the use of wave retarder 126' or 126". Wave retarder 128' includes a quarter wave plate 162 and a half-wave plate 164, which can be aligned with each other, and with axis 140 of linear polarizer 130, in a similar manner as do wave plates 154 and 158 in wave retarder 126" with respect to axis 134 of linear polarizer 124 as described above. Thus, wave retarder 128' may also provide achromatic polarization of light such as light 120C or light beam 122. In this case, polarizer 116 may be configured as an achromatic circular polarizer for in-bound light through window glazing 118 that is collinear to light 120C, where the in-bound light is transmitted with a particular handedness (right or left). Polarizer 114 may be configured as an achromatic circular polarizer for light 120A, such that light 120C is transmitted to polarizer 116 with the opposite handedness.

Therefore, polarizer 116 will substantially extinguish light 120C regardless of the angular relationship between axes 134 and 140.

As discussed before, wave retarders 126 or 128 may be replaced with other suitable types of wave retarders or phase shifting devices. For instance, the quarter wave plates may be replaced with other wave retarders that produce a different amount of phase shift, either more or less than $\pi/2$. In another example, TN-LC films exhibiting birefringence may be used, instead of a conventional wave retarder material. As can be understood by persons skilled in the art, the above-described embodiments may need modification when TN-LC films are used in place of the wave plates or other wave retarders. For instance, instead of optic axes, TN-LC films may be aligned with reference to their "input directors" and "output directors". Further, while normal wave retarders are typically described using the term "retardance", TN-LC films are more commonly described in terms of its "($\Delta$n·d) product", and degree of twist. For example, a TN-LC film having a 64° twist and a ($\Delta$n·d) product of 196 nm at a wavelength of 550 nm will cause a $\pi/2$ phase shift between two orthogonal electric field components of 550 nm linearly polarized light that is aligned to be either parallel or orthogonal to the input director of the TN-LC film. This results in the transmission of circularly polarized light at 550 nm.

For constructing and using TN-LC films as phase shifting devices or ellipticity adjusting devices, the reader may consult U.S. Pat. Nos. 6,882,384, and 6,628,369 to Kumagai et al., issued Sep. 30, 2003; Tang, S. T. et al., "Mueller Calculus and Perfect Polarization Conversion Modes in Liquid Crystal Displays," *Journal of Applied Physics*, 2001, vol. 89, pp. 5288-5294 (hereinafter referred to as "Tang I"); and Tang, S. T. et al., "Reflective Twisted Nematic Liquid Crystal Displays. I. Retardation Compensation," *Journal of Applied Physics*, 1997, vol. 81, pp. 5924-5929, the contents of each of which are incorporated herein by reference.

When TN-LC films are used as the wave retarders, the relative alignment of the linear polarizers 124 and 130 may affect the overall transmission of light.

In an exemplary embodiment, polarizer 114 or 116 may be implemented using a linear polarizer and a TN-LC film with the following suitable characteristics, as disclosed in Tang I (but with different notations). It is assumed below that the angle between the transmission axis of the linear polarizer and the input director of the TN-LC film is $\alpha$, the (twist) angle between the input and output directors of the TN-LC film is $\beta$, and $x=\pi(\Delta n \cdot d)/\lambda$, where $\lambda$ is the incident light wavelength. When the following conditions are met, the TN-LC film can act as a quarter-wave plate for the linearly polarized light received from the linear polarizer:

$$\frac{x\sin\sqrt{(\beta^2+x^2)}}{\sqrt{\beta^2+x^2}} = \pm\frac{1}{\sqrt{2}}, \quad (2)$$

and $$\tan 2(\alpha) = \frac{\sqrt{\beta^2+x^2} \cdot \cot\sqrt{\beta^2+x^2}}{\beta}. \quad (3)$$

When Equation (2) is satisfied, the TN-LC film can act as a quarter wave plate for light of wavelength $\lambda$. When the Equation (3) is satisfied, the TN-LC film is properly aligned with the corresponding linear polarizer or the polarization direction of incident light. The relative alignment between the linear polarizer, or the light polarization direction, and the TN-LC film can affect the polarization state of light transmitted through the TN-LC film. Thus, varying the relative alignment among different components can vary the overall transmission or extinction of a given light. However, as can be appreciated, it is not necessary to adhere strictly to the above equations.

In a specific embodiment, the respective quantities for the TN-LC film in both polarizers 114 and 116 may have the following set of values: $\lambda$=550 nm, ($\Delta$n·d)=165 nm, $\alpha$=−15°, and $\beta$=45°. As can be appreciated, the above set of values only approximately satisfies Equations (2) and (3).

As can be understood, either one or both of polarizers 114 and 116 may include a TN-LC layer or film.

While some exemplary wave retarders and wave plates are described above, it should be understood that they may be replaced with alternative optical devices or components for inducing a phase shift between two orthogonal components of incident light. Further, pairs of wave retarders may be matched to produce a desired phase shift in any effective manner. For example, to keep a particular wavelength of light transmitted through a pair of matched retarders in effectively the same polarization state as in the incident light, the total phase shift can be zero, or any positive or negative multiples of $\pi$. For a total phase shift of zero, the pair of wave retarders may be configured and aligned so that the phase shift induced by one wave retarder is cancelled by the other which induces a reversed phase shift in the same amount, as illustrated above. A pair of chromatic wave retarders having equal orders (e.g., zero, first, second . . . ) may be configured and aligned such that the total phase shift is zero for a wide range of light wavelengths. A pair of achromatic wave retarders may have equal or different orders. Alternatively, the pair of wave retarders may be configured and aligned so that the total phase shift induced is a multiple of $\pi$. A pair of achromatic wave retarders may be configured and aligned such that the total phase shift is a multiple of $\pi$ for a wide range of light wavelengths. When the phase shift is multiple of $2\pi$, the linear polarizers may be oriented as described above. When the phase shift is an odd multiple of $\pi$, the orientation of the linear polarizers may need to be adjusted to account for the rotation of the polarization of the linearly polarized light.

As can be appreciated, the polarization direction of the incident linearly polarized light originated from the display device does not have to be preserved after transmission through the matched wave retarders. The polarization direction may be rotated, as long as it is properly aligned with respect to the linear polarizer covering the window. As discussed, the transmitted light may even be elliptically polarized as long as its polarization ellipticity is sufficiently low and the major axis of its polarization ellipse is properly oriented with respect to the transmission axis of the linear polarizer covering the window so that it can be effectively extinguished by the linear polarizer covering the window.

As can be understood by persons skilled in the art, it is not necessary that any source of light emits completely polarized or completely unpolarized light for some embodiments of the present invention to function properly. Polarized lights may have different degrees of polarization. Further, any light transmitted by a polarizer may be in a single polarization state or contain components that are in different polarization states, as long as the desired polarization state is sufficiently dominant for the intended purpose. As used herein, when reference is made to polarized light, its degree of polarization may be 1 or less than 1; when reference is made to unpolarized light, it may contain unpolarized or randomly polarized components.

In some embodiments, the display screen or the window may be completely covered by the corresponding polarizer. In other embodiments, only a portion of the display or the window may be covered by the corresponding polarizer. For example, the display screen may have a portion that needs to be blocked from viewing by other road users and another portion that displays an image intended to be seen by other road users. In particular, if the display is positioned near the headliner of the cab, then tailing vehicles may have a line of sight to the display though the top portion of the window.

The light emitted from the display may be completely blocked or partially blocked by the light filter system. For example, in some embodiments, the display may display images which contain information that is to be blocked and information that is to be transmitted through the window. Further, as can be appreciated, for some purposes such as privacy and safety purposes, it may be sufficient if the external visibility of the displayed image is reduced to a degree such that an outside observer can see a vague image through the vehicle window but cannot discern meaningful information from the vague image. In such a case, privacy can be protected. Road safety is also improved as an outside road user is unlikely to be continuously distracted by a vague image that conveys no meaningful information.

In an exemplary embodiment, the display may emit both polarized and unpolarized light. The light filter system may be configured and aligned to block the polarized light and allow at least a portion of the unpolarized light to transmit through. In one specific implementation of such a system, the display is covered with a quarter wave plate only and the window is covered with a quarter wave plate and a linear polarizer, such as described above, wherein the linear polarizer is cross aligned with the polarized light emitted from the display. As a result, the polarized light is blocked by the filter system while the unpolarized light emitted from the display can transmit through the filter system.

In a different embodiment, the display may emit light of wavelengths in different ranges for conveying different types of signals. As discussed before, the polarizer components, such as wave retarders, may be selected so that they transmit light differently depending on the wavelengths of light. Thus, the light filter system may be configured to selectively block or transmit light of wavelengths in different ranges so as to selectively block or transmit different types of signals.

In some embodiments, the wave-retarders used in the light filter system may have the same or similar spectral response. In other embodiments, they may have different spectral response.

It should also be understood that a transparent and optically isotropic material may be interposed between any two of the polarizers, the display, and the window without substantially affecting the operation of a light filtering system described herein, as the material will not alter the polarization state of light transmitted therethrough. Thus, suitable layers or coatings, such as anti-reflection layers, made of such a material may be included or incorporated in the light filter system to improve its functionality and performance. In a particular example, cellulose triacetate (CTA) having low a-plate retardance and some c-plate retardance may be sputter coated to produce an antireflective layer.

The window surface or display screen surface may be flat or curved. Similarly, the polarizer films or layers may have flat or curved surfaces, depending on the particular embodiment. The relative orientations of the film axes may vary over the surface of the display or window.

Depending on the viewing angle and head tilt of the viewer, the display or window covered by a polarizer described above may appear to have different brightness, saturation, or hue to the viewer who wears polarized eyewear. Such variations may be tolerable or acceptable. However, if desired, such variations may be reduced or minimized, as described herein and can be understood by persons skilled in the art.

As alluded to earlier, an optical element such as a wave retarder, a wave plate, a TN-LC film, or a linear polarizer may have characteristics that are varied spatially (textured or patterned) across the surface of the optical element such that the displayed image is obscured when viewed through the vehicle window but not completely blocked. A textured or patterned polarizer may also be advantageous for reducing manufacturing tolerance. A texture or pattern may be produced by spatially varying the characteristics of the optical element. For example, the characteristics of polarization rotator 148 may be patterned using techniques discussed in U.S. Pat. No. 5,903,330 to Funfschilling et al., issued May 11, 1999, the contents of which are incorporated herein by reference. In another example, a polarizer may be patterned as described by Yip. In yet another example, the characteristics of a wave retarder may be patterned by locally stressing the film.

As can be understood, the light transmission control systems described above may be mounted on any vehicle that has a cab with a window for controlling light transmission through the window. As an embodiment of the light transmission control system can be conveniently used for different vehicles, it may be provided as a kit. The kit may include the two polarizers for covering the display and window respectively, and may optionally include other components for installing the polarizers.

Further, the light transmission control system may also be adapted for use in other environments outside a vehicle. For example, a similar system may be used in a building or outdoor. The system may be used with an automated teller machine (ATM) for preventing others, such as those waiting in line, from seeing the information displayed on the ATM when a user is accessing the ATM. Another possible application is to reduce disturbance caused by a display such as a TV to others in a shared environment. The light transmission control system may also be used in other similar situations where a display is to be viewed by users in a defined region and not by others outside the defined region. The systems described herein can be readily modified by those skilled in the art for use in these different applications.

Test Results

Figure 11:
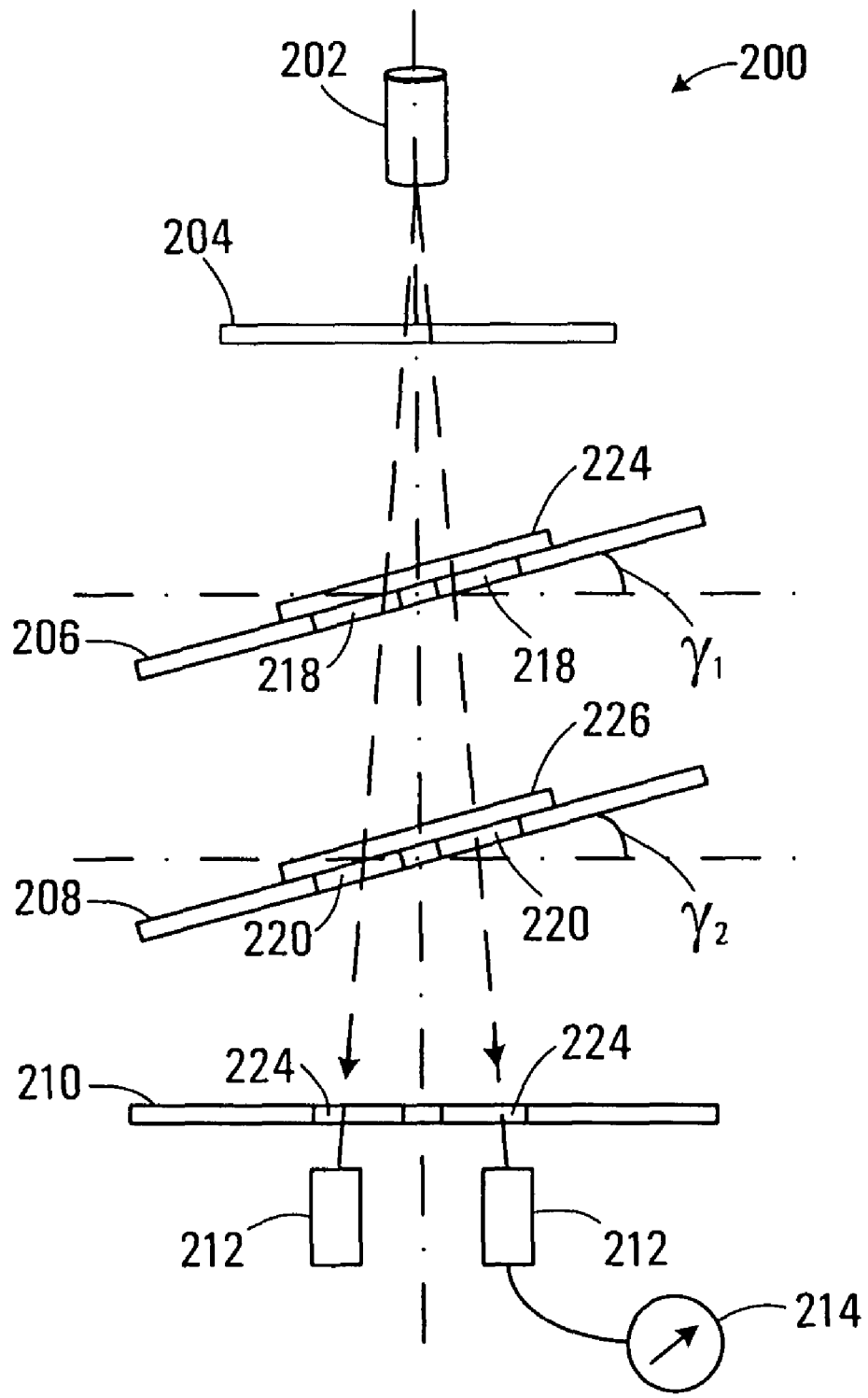
FIG. 11 is a schematic side plan view of a test station for testing sample light filter systems.

Example light filtering systems were tested using a test station 200 as schematically illustrated in FIG. 11. Test station 200 included a laser source 202, and transparent support platforms 204, 206, 208, and 210. Two silicon photodiodes 212 were placed below platform 210. A multimeter 212 was selectively connected to photodiodes 212 for measuring the electrical signal strength resulted from light received by photodiodes 212.

Laser source 202 emits a beam of laser substantially vertically downward. Lasers with different characteristic wavelengths were selectively used depending on the wavelengths involved in a particular test. The lasers were obtained from World Star Tech (Canada), which included a 532 nm (green) laser (DPGL-05S), and a 635 nm (red) laser (CH5-7G-635). A laser line (UHL5-25P-635-45) (not shown) was also used, which was rotatable about a vertical axis.

Platforms 204 and 210 were fixed in position and the platform surfaces were parallel to the horizontal level. Each of platforms 206 and 208 was tilted independently about a respective fixed tilt axis. The two tilt axes were parallel with each other and with the horizontal level. As depicted, they are normal to the page. The tilt axes were used as the reference axis for alignment For example, the rotation angle of the laser line was recorded with respect to the tilt axes. Hereinafter, unless otherwise specified, all rotation angles are with respect to the tilt axes. Platform 206 was titled at a fixed angle of 0.5° with respect to the horizontal level during all measurements ($\gamma_1 = 0.5°$). The tilt angle ($\gamma_2$) of platform 208 was 0.5 or 30° in different tests.

The silicon photodiodes were obtained from Hamamatsu Photonics (Japan) (S2386-5K). They were reverse-biased and produced electrical currents that were linearly proportional to incident light power.

Platforms 204 and 210 were only used during calibration and were not used during actual testing. Each platform 206, 208 or 210 had two holes 118, 220 or 222 that allowed light to pass through without refraction.

Sample optical films 224 and 226 were respectively supported on platforms 206 and 208 for various tests. Optical film 224 corresponds to polarizer 20 (FIG. 1), and optical film 226 corresponds to polarizer 22 (FIG. 1) or polarized eyewear, depending on whether a wave retarder is included. Each sample optical film 224 or 226 included at least a linear polarizer component. The comparison samples included only the linear polarizer. The test samples included a linear polarizer and a wave retarder. The linear polarizers used were obtained from Sanritz Corporation (LLC2-8218S). The wave retarders used were polycarbonate retarders with varying retardance as specified below, unless otherwise specified. In some samples, additional optical layers were included as specified below.

The tests were conducted in a darkroom to limit ambient light.

Each combination of test samples was tested with the transmission axis of the linear polarizer in sample film 224 aligned at an angle ($\gamma_3$) of 0, 45, or 90°. At each alignment angle, measurements were taken with the transmission axis of the linear polarizer in sample film 226 rotated from 0 to 180°, at 10° increments. The relative angle between the two transmission axes of the two linear polarizers (referred to hereinafter as "relative angle") was thus varied. The power of light received at photodiodes 212 and 214 was measured for different relative angles. To obtain the transmission and extinction ratio, the power of light received at photodiodes 212 and 214 was measured with and without optical film 226 for each given laser source, which are denoted as P and $P_0$, respectively. The extinction ratio for light of a given wavelength was calculated as: $R_e = P_0/P$; and the transmission ratio is defined as $R_t = 1/R_e = P/P_0$. Representative test results are listed in Tables IA, IB, and II to VI.

Tables IA and IB show the values of transmission ratio ($R_t$) for the red and green lasers respectively.

TABLE IA

Transmission Ratio $R_t$ for red laser (635 nm)

| Test | $(Y_2 - Y_1)/Y_3$ | 0 | 20 | 40 | 60 | 80 | 90 | 100 | 120 | 140 | 160 | 180 |
|---|---|---|---|---|---|---|---|---|---|---|---|---|
| I | 0/0 | .688 | .592 | .403 | .167 | .018 | .000 | .024 | .177 | .407 | .616 | .687 |
| II | 0/0 | .058 | .050 | .030 | .012 | .001 | .001 | .004 | .018 | .034 | .049 | .053 |
| III | 29.5/0 | .050 | .024 | .007 | .002 | .000 | .002 | .005 | .019 | .044 | .060 | .050 |
|  | 29.5/45 | .036 | .033 | .031 | .217 | .011 | .007 | .004 | .007 | .026 | .033 | .033 |
|  | 29.5/90 | .066 | .073 | .062 | .037 | .006 | .000 | .003 | .021 | .040 | .054 | .070 |
| IV | 0/0 | .446 | .419 | .366 | .301 | .259 | .256 | .262 | .306 | .364 | .407 | .437 |
| V | 0/0 | .002 | .002 | .002 | .002 | .002 | .002 | .002 | .002 | .002 | .002 | .002 |
| VI | 29.5/0 | .005 | .015 | .022 | .018 | .009 | .006 | .004 | .003 | .004 | .004 | .006 |
|  | 29.5/45 | .023 | .016 | .008 | .003 | .004 | .004 | .005 | .004 | .007 | .018 | .024 |
|  | 29.5/90 | .006 | .004 | .004 | .005 | .004 | .005 | .009 | .021 | .023 | .012 | .007 |
| VII | 0/0 | .340 | .355 | .359 | .351 | .341 | .345 | .339 | .336 | .346 | .354 | .360 |

TABLE IB

Transmission Ratio $R_t$ for green laser (532 nm)

| Test | $(Y_2 - Y_1)/Y_3$ | 0 | 20 | 40 | 60 | 80 | 90 | 100 | 120 | 140 | 160 | 180 |
|---|---|---|---|---|---|---|---|---|---|---|---|---|
| I | 0/0 | .778 | .679 | .442 | .183 | .021 | .000 | .025 | .196 | .452 | .679 | 0.768 |
| II | 0/0 | .001 | .001 | .000 | .000 | .000 | .000 | .000 | .001 | .001 | .001 | .001 |
| III | 29.5/0 | .002 | .005 | .008 | .007 | .002 | .001 | .001 | .003 | .004 | .002 | .000 |
|  | 29.5/45 | .014 | .010 | .003 | .002 | .006 | .006 | .005 | .002 | .002 | .007 | .012 |
|  | 29.5/90 | .002 | .001 | .003 | .004 | .002 | .001 | .001 | .006 | .007 | .006 | .002 |
| IV | 0/0 | .379 | .391 | .392 | .403 | .397 | .395 | .392 | .368 | .377 | .374 | .376 |
| V | 0/0 | .000 | .000 | .001 | .001 | .002 | .003 | .004 | .003 | .002 | .001 | .001 |
| VI | 29.5/0 | .005 | .008 | .016 | .018 | .015 | .011 | .010 | .009 | .007 | .006 | .004 |
|  | 29.5/45 | .010 | .009 | .006 | .004 | .003 | .003 | .003 | .003 | .002 | .006 | .009 |
|  | 29.5/90 | .012 | .010 | .009 | .008 | .008 | .007 | .008 | .015 | .016 | .011 | .008 |
| VII | 0/0 | .364 | .375 | .396 | .409 | .397 | .397 | .398 | .370 | .366 | .358 | .358 |

TABLE II

Range of $R_t$ Variation at Different Relative Angles

|  | Test I (comparison) | | Test IV (narrow-band) | | Test VII (wide-band) | |
|---|---|---|---|---|---|---|
| Wavelength (nm) | 635 | 532 | 635 | 532 | 635 | 532 |
| Maximum $R_t$ | 0.688 | 0.778 | 0.446 | 0.403 | 0.360 | 0.416 |
| Minimum $R_t$ | 0.000 | 0.000 | 0.256 | 0.373 | 0.334 | 0.358 |
| Variation | 0.688 | 0.778 | 0.190 | 0.030 | 0.026 | 0.058 |
| % Variation | 100.00% | 99.99% | 42.50% | 7.43% | 7.24% | 13.97% |

TABLE III

Maximum Difference in $R_t$ between Red and Green lasers

|  | Test I (comparison) | | Test IV (narrow-band) | | Test VII (wide-band) | |
| --- | --- | --- | --- | --- | --- | --- |
| Wavelength (nm) | 635 | 532 | 635 | 532 | 635 | 532 |
| $R_t$ at maximum difference | .650 | .745 | .256 | .395 | .355 | .416 |
| Maximum difference in $R_t$ | .095 | | .139 | | .061 | |

TABLE IV

Angles for Minimum $R_t$

|  | Test I (comparison) | | Test II (narrow-band) | | Test V (wide-band) | |
| --- | --- | --- | --- | --- | --- | --- |
| Wavelength (nm) | 635 | 532 | 635 | 532 | 635 | 532 |
| Minimum $R_t$ | .000 | .000 | .001 | .000 | .002 | .000 |
| Relative Angle | 90 | 90 | 90 | 90 | 10 | 10 |

TABLE V

Range of $R_t$ Variation at Different Relative Angles

|  | Test I (comparison) | | Test II (narrow-band) | | Test V (wide-band) | |
| --- | --- | --- | --- | --- | --- | --- |
| Wavelength (nm) | 635 | 532 | 635 | 532 | 635 | 532 |
| Maximum $R_t$ | .688 | .778 | .058 | .001 | .002 | .004 |
| Minimum $R_t$ | .000 | .000 | .001 | .000 | .002 | .000 |
| Variation | .688 | .778 | .057 | .001 | .000 | .004 |

TABLE VI

Range of $R_t$ variation at Different Tilt and Relative Angles

|  | Test V | | | | Test VI | | | |
| --- | --- | --- | --- | --- | --- | --- | --- | --- |
| Relative Tilt ($Y_2 - Y_1$) | 0 | | | | 29.5 | | | |
| Alignment Angle ($Y_3$) | 0 | | 0 | | 45 | | 90 | |
| Wavelength (nm) | 635 | 532 | 635 | 532 | 635 | 532 | 635 | 532 |
| Maximum $R_t$ | .002 | .004 | .022 | .018 | .024 | .010 | .023 | .016 |
| Minimum $R_t$ | .002 | .000 | .004 | .005 | .003 | .002 | .003 | .007 |
| Variation | .000 | .004 | .018 | 0.014 | .021 | .008 | .020 | .009 |

Test I (Comparison Test)

Each of films 224 and 226 was made of a linear polarizer. Platform 208 was titled at 0.5°. The transmission axis of film 224 was fixed at 0°. As shown in Table IA and IB, the transmission ratio (hence the extinction ratio) was highly dependent on the relative angle, as expected. The transmission ratio was low when the relative angle between the transmission axes of the two linear polarizers was within a narrow range around 90°, and maximum extinction was obtained when the transmission axes were crossed (i.e. at 90°), for both green and red lasers. However, when the transmission axes were not substantially crossed, the measured transmission ratio was relative high, such as from about 0.4 to about 0.7 (corresponding to extinction ratio from about 1.4 to about 2.5) for both red and green lasers when the misalignment was more than 30°.

Test II

Each of films 224 and 226 included a linear polarizer and a quarter wave retarder which has a retardance of 138 nm. The optical axis of the wave retarder was at 45° with respect to the transmission axis of the linear polarizer. The optical films were placed so that the two wave retarders faced each other. Platform 208 was titled at 0.5°. The transmission axis of film 224 was fixed at 0°. As compared to Test I results, the measured extinction ratio was at least an order of magnitude higher in Test II at all relative angles. This means that the tolerance for misalignment may be relatively high when these polarizer films are used. When the two transmission axes were crossed, the measured transmission ratio was lower than 0.001 as shown in Table IA with a corresponding extinction ratio higher than 1,000 for the red laser, and the measured transmission ratio for the green laser was even lower with a corresponding extinction ratio of higher than about 4,440. As can be seen in Tables IA and IB, for the red laser, the transmission ratio increased significantly when the relative angle was outside a narrow range around 90°, but for the green laser, the transmission ratio remained lower than about 0.001 (with the corresponding extinction ratio higher than 1,000) at all measured relative angles.

Test III

The optical films and setup were the same as those used in Test II, with the exception that platform 208 was tilted to 30° and the transmission axis of optical film 224 was aligned at 0°, 45°, or 90° respectively. The dependence of measured transmission (extinction) ratio on the relative angle between the transmission axes was significantly different from that observed in Test II. The measured transmission (extinction) ratio also varied depending on the relative angle between the transmission axis and the tilt axis. The transmission ratio was typically much lower for the green laser than for the red laser.

These results suggest that the relative tilt and the relative angles between the tilt axis and the transmission axes should be taken into account when selecting the optimal configuration and orientation for the polarizers. In some applications, however, these particular films may have acceptable performance at various tilt angles.

Test IV

The optical film 224 and the setup was the same as in Test II, but optical film 226 included only a linear polarizer. The measured transmission ratio remained higher than about 0.25, with corresponding extinction ratio less than about 4, at all relative angles, for both red and green lasers. The transmission (extinction) ratio remained relatively constant for the green laser at different relative angles, varying from about 0.37 to about 0.40. As compared to the results in comparison Test I, the results of Test IV show that a user wearing a polarized eyewear can view a display covered with this particular optical film 224 without experiencing large intensity variation when the user's head is rotated relative to the display. The difference in transmission ratio for the green and red lasers suggests that some hue offset may be visible to the user.

Test V

Each optical film 224 and 226 included a linear polarizer, a 138 nm quarter-wave retarder, and a 275 nm half-wave retarder sandwiched between them. An optical axis of the quarter-wave retarder was at 75° with respect to the transmission axis of the linear polarizer, and at 60° with respect to an optical axis of the half-wave retarder. The other conditions were the same as in Test II. As shown in Tables IA and IB, at all relative angles the measured transmission ratio was consistently lower than about 0.002 (with $R_e$ higher than about 500) for the red laser, and lower than about 0.004 (with $R_e$ higher than bout 250) for the green laser. Thus, with these optical films, their relative orientation may be varied and still achieve good performance.

Test VI

The optical films were the same as in Test V, but the setup was similar to that of Test III. The highest measured transmission ratio was about 0.024 (with the corresponding lowest $R_e$ being about 43) at all relative angles for both green and red lasers, even at a large tilt angle and at various alignment angles of the transmission axes.

Test VII

The optical film 224 and the setup were the same as in Test V, but the optical film 226 included only a linear polarizer. The measured transmission (extinction) ratio remained low (high) and relatively constant. As shown in Table IA and IB, $R_t$ varied from about 0.34 to about 0.41 ($R_e$ from about 2.4 to about 2.9) at different relative angles for both green and red lasers. There was a small difference in transmission ratio for green and red lasers (the largest difference at any given relative angle being about 0.06), suggesting a small visible hue offset, which was, however, significantly smaller than that exhibited in Test IV where the largest difference at the same relative angle was about 0.14.

Table II compares the results for Tests I (comparison). IV and VII, in terms of the range of variation in transmission ratio. As can be seen, the transmission ratio varied much less in Test IV and VII than in Test I. This result indicates that a user wearing polarized glasses would see less intensity variation when the user's head is rotated relative to a composite polarizer according to an embodiment of the present invention, as compared to a simple linear polarizer. While both narrow- and wide-band composite polarizers reduce intensity variation, the wide-band version may produce a better result.

Table III compares the wavelength dependency for results of Tests I, IV, and VII. The maximum difference in $R_t$ in each case is listed. As can be seen, the wide-band composite polarizer (Test VII) exhibited the smallest difference, thus the smallest hue effect.

Table IV compares the minimum $R_t$ and the corresponding relative angles for Tests I, II and V. As can be seen, all of the tested arrangements produced very good extinction results at the optimal alignment. The relative angle for minimum transmission in Test V where the composite polarizers included half-wave plates was not zero, but as can be seen in Tables IA and IB, the effect of varying the relative orientation was small.

Table V compares the ranges of variation in $R_t$ for Tests I, II, and V. As can be seen, the variation range is reduced in both Test II and Test V, as compared to Test I. This suggests that with embodiments of the present invention, a larger degree of misalignment may be tolerable, as compared to filters that use only linear polarizers. As the variation range for the wide-band composite polarizers (Test V) is so small, misalignment may have no noticeable effect. Thus, such polarizers may be suitable for installation by persons without special skills or without special alignment equipment. For example, they may be suitable for aftermarket installation.

Table VI compares the variation ranges for results in Tests V and VI, and shows the effect of relative tilting angles. As can be appreciated by persons skilled in the art, these results indicate that tilting the display relative to the window would degrade the performance somewhat. However, even when the two polarizer films were tilted at about 30°, improved performance was achieved as compared to the results in Test I (comparison), by more than an order of magnitude reduction in transmission ratio variation. This result also suggests that the wide-band composite polarizers are suitable for aftermarket installation as they can be adapted for use in different display-window tilt/orientation arrangements, such as in vehicles of different models and makes.

Other features, benefits and advantages of the embodiments described herein not expressly mentioned above can be understood from this description and the drawings by those skilled in the art.

The contents of each reference cited above are hereby incorporated herein by reference.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A light transmission control system for a vehicle, comprising:

a combination of a display and a first polarizer, said combination disposed in said vehicle and comprising linear polarizing means for linearly polarizing light, said first polarizer comprising an ellipticity increaser, said ellipticity increaser configured and oriented with respect to said linear polarizing means such that light of at least one visible wavelength passing from said linear polarizing means through said ellipticity increaser has a first ellipticity of higher than 0.5; and a second polarizer associated with a window of said vehicle and comprising an ellipticity adjuster and a linear polarizer, said ellipticity adjuster oriented with respect to said linear polarizer such that light of said at least one visible wavelength passing from said linear polarizer through said ellipticity adjuster has a second ellipticity of higher than 0.5, said ellipticity increaser and said ellipticity adjuster disposed between said linear polarizing means and said linear polarizer, said ellipticity increaser and ellipticity adjuster configured and oriented with respect to each other such that light of said at least one visible wavelength passing from said linear polarizing means through said ellipticity increaser and said ellipticity adjuster to said linear polarizer has a polarization ellipse with a third ellipticity of less than 0.5, a major axis of said polarization ellipse being substantially perpendicular to a transmission axis of said linear polarizer.

2. The light transmission control system of claim 1, wherein said at least one visible wavelength comprises at least one fourth of all visible wavelengths.

3. The light transmission control system of claim 1, wherein said at least one visible wavelength comprises all visible wavelengths.

4. The light transmission control system of claim 1, wherein said third ellipticity is less than 0.15.

5. The light transmission control system of claim 1, wherein said display comprises said linear polarizing means.

6. The light transmission control system of claim 1, wherein said first polarizer comprises said linear polarizing means.

7. The light transmission control system of claim 1, wherein said linear polarizer is a first linear polarizer, and said linear polarizing means comprises a second linear polarizer.

8. The light transmission control system of claim 7, wherein said transmission axis of said first linear polarizer is substantially perpendicular to a transmission axis of said second linear polarizer.

9. The light transmission control system of claim 8, wherein said ellipticity increaser comprises a first wave retarder and said ellipticity adjuster comprises a second wave retarder.

10. The light transmission control system of claim 9, wherein said first wave retarder has an optic axis at least substantially perpendicular to an optic axis of said second wave retarder, an identical polarity to that of said second wave retarder, and a retardance at least substantially equal to that of said second wave retarder.

11. The light transmission control system of claim 9, wherein said first wave retarder has an optic axis at least substantially parallel to an optic axis of said second wave retarder, an opposite polarity to that of said second wave retarder, and a retardance at least substantially equal to that of said second wave retarder.

12. The light transmission control system of claim 9, wherein said first wave retarder comprises a first quarter wave plate, said first quarter wave plate having an optic axis at an angle of about 45° with respect to a transmission axis of said second linear polarizer, and wherein said second wave retarder comprises a second quarter wave plate, said second quarter wave plate having an optic axis at an angle of about 45° with respect to a transmission axis of said first linear polarizer.

13. The light transmission control system of claim 12, wherein each one of said first and second quarter-wave plates is a zero-order quarter-wave plate for said at least one visible wavelength.

14. The light transmission control system of claim 1, wherein each one of said first and second polarizers is an achromatic polarizer for a plurality of visible wavelengths.

15. The light transmission control system of claim 14, wherein at least one of said first and second polarizers comprises a half wave plate and a quarter wave plate.

16. The light transmission control system of claim 14, wherein at least one of said first and second polarizers comprises a dispersion compensated quarter-wave plate.

17. The light transmission control system of claim 1, wherein said first polarizer is configured and oriented such that said light having said first ellipticity has a first handedness, and wherein said second polarizer is configured and oriented such that said light having said second ellipticity has a second handedness opposite to said first handedness.

18. The light transmission control system of claim 1, wherein said ellipticity increaser and ellipticity adjuster are configured and oriented with respect to each other such that an ellipticity of light which has been increased by said ellipticity increaser is at least substantially reduced by said ellipticity adjuster.

19. The light transmission control system of claim 1, wherein at least one of said first and second ellipticities is about 1, and said third ellipticity is about 0.

20. The light transmission control system of claim 1, wherein each one of said first and second polarizers comprises a circular polarizer.

21. The light transmission control system of claim 1, wherein said combination comprises a polarization rotator located between said display and said ellipticity increaser.

22. The light transmission control system of claim 21, wherein said polarization rotator comprises a rotator selected from a twisted nematic liquid crystal film or an achromatic half-wave plate.

23. The light transmission control system of claim 1, wherein at least one of said ellipticity increaser and ellipticity adjuster comprises a material selected from a polymer material, a liquid crystal material, a twisted nematic liquid crystal (TN-LC) material, a dispersion-compensated material, a uniaxially birefringent material, and a biaxially birefringent material.

24. The light transmission control system of claim 9, wherein said first polarizer comprises a c-plate adjacent said first wave retarder, said c-plate having a retardance selected to reduce ellipticity variation between light transmitted from said display through said first wave retarder at different incident angles with respect to a surface of said first wave retarder.

25. The light transmission control system of claim 15, wherein said first polarizer comprises two c-plates, said quarter wave plate, and said half wave plate sandwiched between said c-plates, each one of said c-plates having a retardance selected to reduce ellipticity variation between light transmitted from said display through said first polarizer at different incident angles with respect to a surface of said first polarizer.

26. A light filter system for limiting visibility of a display in a vehicle through a window of said vehicle, comprising:
   a first polarizer covering said window and comprising
      a linear polarizer and
      a first wave retarder, said first wave retarder located between said linear polarizer and said display,
      said first polarizer configured and arranged for transmitting external light of at least one visible wavelength therethrough into said vehicle in a polarized state having a polarization ellipticity from 0.5 to 1; and
   a second polarizer covering said display and comprising
      a second wave retarder,
      said second polarizer configured and arranged for transmitting light of said at least one visible wavelength emitted from said display therethrough in a polarized state having a polarization ellipticity from 0.5 to 1;
   said first and second polarizers being configured and aligned such that transmission of visible light emitted from said display through both of said first and second polarizers is limited, thereby reducing visibility of said display through said window.

27. The light filter system of claim 26, wherein said at least one visible wavelength comprises at least one fourth of all visible wavelengths.

28. The light filter system of claim 26, wherein said at least one visible wavelength comprises all visible wavelengths.

29. The light filter system of claim 26, wherein said third ellipticity is less than 0.15.

30. The light filter system of claim 26, wherein said first and second polarizers are configured and aligned to minimize transmission of said visible light emitted from said display through both of said polarizers.

31. The light filter system of claim 26, wherein said linear polarizer and said first wave retarder are aligned to minimize transmission of said external light that is horizontally polarized therethrough.

32. The light filter system of claim 26, wherein said linear polarizer is a first linear polarizer, and said second polarizer comprises a second linear polarizer located between said second wave retarder and said display.

33. The light filter system of claim 32, wherein said second polarizer is configured and arranged to optimize transmission of said visible light therethrough.

34. The light filter system of claim 26, wherein said first wave retarder comprises a first quarter wave plate, and said second wave retarder comprises a second quarter wave plate.

35. A method of controlling light transmission in a vehicle, comprising:
providing, in said vehicle, a combination of a display and a first polarizer, said combination comprising linear polarizing means for linearly polarizing light, said first polarizer comprising an ellipticity increaser, said ellipticity increaser oriented with respect to said linear polarizing means such that light of at least one visible wavelength passing from said linear polarizing means through said ellipticity increaser has a first ellipticity of higher than 0.5; and
providing a second polarizer associated with a window of said vehicle and comprising an ellipticity adjuster and a linear polarizer, said ellipticity adjuster oriented with respect to said linear polarizer such that light of said at least one visible wavelength passing from said linear polarizer through said ellipticity adjuster has a second ellipticity of higher than 0.5,
said ellipticity increaser and said ellipticity adjuster disposed between said linear polarizing means and said linear polarizer,
said ellipticity increaser and ellipticity adjuster configured and oriented with respect to each other such that light of said at least one visible wavelength passing from said linear polarizing means through said ellipticity increaser and said ellipticity adjuster to said linear polarizer has a polarization ellipse with a third ellipticity of less than 0.5, a major axis of said polarization ellipse being substantially perpendicular to a transmission axis of said linear polarizer.

36. The method of claim 35, wherein said linear polarizer is a first linear polarizer, and said linear polarizing means comprises a second linear polarizer, and wherein said ellipticity increaser comprises a first quarter wave plate, and said ellipticity adjuster comprises a second quarter wave plate.

37. The method of claim 35, wherein said ellipticity increaser comprises a first wave retarder and said ellipticity adjuster comprises a second wave retarder.

38. The method of claim 37, wherein said first waver retarder has an optic axis at least substantially perpendicular to an optic axis of said second wave retarder, an identical polarity to that of said second wave retarder, and a retardance at least substantially identical to that of said second wave retarder.

39. The method of claim 37, wherein said first wave retarder has an optic axis at least substantially parallel to an optic axis of said second wave retarder, an opposite polarity to that of said second wave retarder, and a retardance at least substantially identical to that of said second wave retarder.

40. The method of claim 36, wherein each one of said first and second quarter wave plates is a dispersion compensated achromatic quarter-wave plate.

41. The method of claim 36, said transmission axis of said first linear polarizer being substantially perpendicular to a transmission axis of said second linear polarizer.

42. The method of claim 41, wherein said first quarter wave plate has an optic axis at an angle of about 45° with respect to a transmission axis of said second linear polarizer, and said second quarter wave plate has an optic axis at an angle of about 45° with respect to said transmission axis of said first linear polarizer.

43. The method of claim 35, wherein said combination comprises a polarization rotator located between said display and said ellipticity increaser.

44. The method of claim 35, wherein said at least one visible wavelength comprises at least one fourth of all visible wavelengths.

45. The method of claim 35, wherein said at least one visible wavelength comprises all visible wavelengths.

46. The method of claim 35, wherein said third ellipticity is less than 0.15.

47. A vehicle comprising a cab having a window, and the light transmission control system of claim 1 mounted on said vehicle for controlling transmission of light through said window.

48. A kit for controlling light transmission in a vehicle, said kit comprising:
a first polarizer for covering a display of said vehicle, said first polarizer comprising a first linear polarizer and an ellipticity increaser, said ellipticity increaser oriented with respect to said first linear polarizer such that light of at least one visible wavelength passing from said first linear polarizer through said ellipticity increaser has a first ellipticity of higher than 0.5; and
a second polarizer for covering a window of said vehicle, said second polarizer comprising an ellipticity adjuster and a second linear polarizer, said ellipticity adjuster oriented with respect to said second linear polarizer such that light of said at least one visible wavelength passing from said second linear polarizer through said ellipticity adjuster has a second ellipticity of higher than 0.5,
said ellipticity increaser and ellipticity adjuster being configured so that, when said ellipticity increaser and said ellipticity adjuster are disposed between said first and second linear polarizers, they are capable of being oriented with respect to each other such that light of said at least one visible wavelength passing from said linear polarizing means through said ellipticity increaser and said ellipticity adjuster to said linear polarizer has a polarization ellipse with a third ellipticity of less than 0.5, a major axis of said polarization ellipse being substantially perpendicular to a transmission axis of said linear polarizer.

49. A light transmission control system for a vehicle, comprising:
first polarizing means associated with a display of said vehicle and comprising first linear polarizing means for linearly polarizing light and ellipticity increasing means for increasing ellipticity of light, said ellipticity increasing means oriented with respect to said first linear polarizing means such that light of at least one visible wavelength passing from said first linear polarizing means through said ellipticity increasing means has a first ellipticity of higher than 0.5; and
second polarizing means associated with a window of said vehicle and comprising ellipticity adjusting means for adjusting ellipticity of light and second linear polarizing means for linearly polarizing light, said ellipticity adjusting means oriented with respect to said second linear polarizing means such that light of said at least one visible wavelength passing from said linear polarizing means through said ellipticity adjusting means has a second ellipticity of higher than 0.5, said ellipticity increasing means and said ellipticity adjusting means disposed between said first and second linear polarizing means, said ellipticity increasing means and ellipticity adjusting means configured and oriented with respect to each other such that light of said at least one visible wavelength passing from said first linear polarizing means through said ellipticity increasing means and said ellipticity adjusting means to said second linear polarizing means has a polarization ellipse with a third ellipticity of less than 0.5, a major axis of said polarization ellipse being substantially perpendicular to a transmission axis of said second linear polarizing means.

* * * * *